(12) United States Patent
Negishi et al.

(10) Patent No.: US 9,023,749 B2
(45) Date of Patent: May 5, 2015

(54) METHOD FOR PRODUCING REGENERATED CLAY, REGENERATED CLAY, AND METHOD FOR PRODUCING PURIFIED FATS AND OILS

(75) Inventors: Satoshi Negishi, Yokosuka (JP); Kunihiko Tokunaga, Yokohama (JP); Hitoshi Itou, Yokohama (JP); Yumi Kawanobe, Yokohama (JP); Hiroyuki Itagaki, Yokohama (JP)

(73) Assignee: The Nisshin Oillio Group, Ltd., Tokyo (JP)

( * ) Notice: Subject to any disclaimer, the term of this patent is extended or adjusted under 35 U.S.C. 154(b) by 152 days.

(21) Appl. No.: 13/816,629

(22) PCT Filed: Oct. 3, 2011

(86) PCT No.: PCT/JP2011/072730
§ 371 (c)(1),
(2), (4) Date: Feb. 12, 2013

(87) PCT Pub. No.: WO2012/066860
PCT Pub. Date: May 24, 2012

(65) Prior Publication Data
US 2013/0150603 A1    Jun. 13, 2013

(30) Foreign Application Priority Data

Nov. 15, 2010 (JP) .................. 2010-255208

(51) Int. Cl.
*B01J 20/34* (2006.01)
*C11B 3/10* (2006.01)
(Continued)

(52) U.S. Cl.
CPC ............. *B01J 20/3433* (2013.01); *C11B 3/10* (2013.01); *C11C 3/003* (2013.01); *B01J 20/12* (2013.01);
(Continued)

(58) Field of Classification Search
None
See application file for complete search history.

(56) References Cited

U.S. PATENT DOCUMENTS

| 6,635,595 B2 * | 10/2003 | Kaimal et al. | 502/33 |
| 2005/0084941 A1 * | 4/2005 | Abe et al. | 435/135 |
| 2009/0199460 A1 * | 8/2009 | Munson et al. | 44/308 |

FOREIGN PATENT DOCUMENTS

| CN | 101492622 A | 7/2009 |
| GB | 482549 | 3/1938 |

(Continued)

OTHER PUBLICATIONS

JP 2004-223426, Kimura Chem Plants Co, Ltd., Method for treating inorganic material containing oil, 2004, English Translation, 17 pages.*

(Continued)

*Primary Examiner* — Yate K Cutliff
(74) *Attorney, Agent, or Firm* — Wood, Herron & Evans, LLP

(57) ABSTRACT

The present invention provides a method for performing regeneration of a decolorization capacity of waste clay that has been used for purification of fats and oils, and production of a thermally recyclable compound as a biofuel from oily ingredients in the waste clay at the same time in a convenient manner. That is, a method for producing purified fats and oils of the invention includes: a method for producing regenerated clay including the steps of mixing waste clay that has been used for purification of fats and oils, lower alcohol, and an acidic catalyst; and performing extraction of oily ingredients from the waste clay, and an esterification reaction between the fats and oils and/or a free fatty acid in the oily ingredients and the lower alcohol at the same time so as to regenerate a decolorization capacity of the waste clay; regenerated clay that is produced by the method for producing the regenerated clay; and a process of decolorizing the fats and oils using the regenerated clay.

14 Claims, 9 Drawing Sheets

(51) Int. Cl.
*C11C 3/00* (2006.01)
*B01J 20/12* (2006.01)
*C11B 13/04* (2006.01)
*C10L 1/02* (2006.01)

(52) U.S. Cl.
CPC ............ *C11B 13/04* (2013.01); *C10L 2290/12* (2013.01); *C10L 1/026* (2013.01); *C10L 2290/542* (2013.01); *Y02E 50/13* (2013.01)

(56) References Cited

FOREIGN PATENT DOCUMENTS

| | | | | |
|---|---|---|---|---|
| JP | 2003336082 A | 11/2003 | | |
| JP | 2004-223436 | * 8/2004 | ............. | B01D 11/00 |
| JP | 2004223426 A | 8/2004 | | |
| JP | 2005171099 A | 6/2005 | | |
| JP | 2009040979 A | 2/2009 | | |
| JP | 2009138185 A | 6/2009 | | |
| JP | 2010013511 A | 1/2010 | | |

OTHER PUBLICATIONS

Boey, P. et al., Regeneration and reutilizatin of oil-laden spent bleaching clay via in situ transesterification and calcination, Feb. 2011, J.Am Oil Chem Soc., vol. 88, pp. 1247-1253.*

Chinese Patent Office, Office Action issued in Chinese Application No. 201180042656.4, mailed Aug. 20, 2013, 6 pp.

Taiwanese Patent Office, Office Action issued in Application No. 100140550, mailed Nov. 21, 2013, 7 pp.

Tetsuo Ono and Shizuyuki Ota; Technology for Producing Edible Fats and Oils; published in 1991 by Business Center Co., Ltd.

International Search Report issued in International Patent Application No. PCT/JP2011/072730; Nov. 29, 2011; 4 pages.

* cited by examiner

US 9,023,749 B2

METHOD FOR PRODUCING REGENERATED CLAY, REGENERATED CLAY, AND METHOD FOR PRODUCING PURIFIED FATS AND OILS

TECHNICAL FIELD

The present invention relates to a method for producing regenerated clay from waste clay that is used for the purification of fats and oils, and more particularly, to a method in which extraction of oily ingredients from the waste clay, and an esterification reaction between fats and oils and/or a free fatty acid in the oily ingredients, and lower alcohol are performed at the same time to convert the oily ingredients in the waste clay into ester that can be used as a biofuel while reproducing a decolorization capacity of the waste clay.

Priority is claimed on Japanese Patent Application No. 2010-255208, filed Nov. 15, 2010, the content of which is incorporated herein by reference.

BACKGROUND ART

Fats and oils, which are obtained by removing impurities such as free fatty acids and heavy metals from crude oil derived from animals and plants in a deacidification process, are purified by removing coloring matters such as chlorophyl and carotenoid in a decolorization process. In the decolorization process, clay is generally used, and the coloring matters are adsorbed in pores of the clay, whereby the fats and oils are decolorized. An amount of the clay used is different depending on usage of oil-bearing seed or purified oil, but commonly, the amount used is 0.5 to several mass % on the basis of the fats and oils. Therefore, a large amount of waste clay that has been used for purification of the fats and oils are produced everyday.

It is regarded that commonly, 30 to 40 mass % of oily ingredients on the basis of a total mass of the clay adheres to and remains in the waste clay that has been used for the purification of the fats and oils. The waste clay is mainly disposed as industrial waste. However, it is difficult for the waste clay to be disposed in a state of containing a large amount of oily ingredients, and thus it is necessary to remove the oily ingredients in the waste clay by an arbitrary method.

As a method for extracting the oily ingredients contained in the waste clay, a wet rendering method, a pressurized steam method, a solvent extraction method, and the like have been reviewed in the related art (refer to Non-Patent Document 1). However, it is difficult to completely remove the oily ingredients that are present in the pores of the waste clay, and an effective treatment means has not been found yet. In addition, the waste clay in a state in which several to several tens of mass % of oily ingredients is adhered still to the clay after the treatment is mainly disposed by combustion or the like.

In addition, in recent years, as the method for extracting the oily ingredients from the waste clay, a method for producing a biofuel in which the fats and oils in the waste clay is made to react with an enzyme to be decomposed into a fatty acid, and the purified fatty acid is made to react with lower alcohol to obtain ester is disclosed (refer to Patent Document 1).

CITATION LIST

Patent Document

[Patent Document 1] Japanese Unexamined Patent Application, First Publication No. 2003-336082

Non-Patent Literature

[Non-Patent Document 1] "Technology for producing edible fats and oils" written by Tetsuo Ono and Sizuyuki Ota (joint authorship), published in 1991 by Business Center Co., Ltd.

SUMMARY OF INVENTION

Technical Problem

As described above, in the purification of the fats and oils, waste clay containing a large amount of oily ingredients is produced as a by-product, and an effective method of treating the waste clay has been required. However, as described above, it is difficult to extract or remove the oily ingredients in the waste clay or the fats and oils that are contained in the oily ingredients.

In the method described in Patent Document 1, when decomposing the fats and oils in the waste clay into a fatty acid, a large amount of enzyme is necessary, and thus there is a problem in that the cost may be increased.

In addition, since there is a great impact put on the cost or environment for disposal of the waste clay itself, a method for extracting the oily ingredients contained in the waste clay and of reusing the waste clay after the extraction of the oily ingredients has been required. However, since the clay is relatively cheap, a review on the reusability of the waste clay has not been substantially conducted.

The invention has been made in consideration of the above-described circumstances, and an object thereof is to provide a method for performing regeneration of a decolorization capacity of waste clay and production of a recyclable compound from oily ingredients in the waste clay at the same time in a convenient manner.

Solution to Problem

The present inventors have made a thorough investigation to solve the above-described problem. As a result, they have obtained a finding that the decolorization capacity of the waste clay may be regenerated while producing ester from the oily ingredients in the waste clay by mixing waste clay, lower alcohol, and an acidic catalyst, and by which they have accomplished the invention.

That is, the invention provides a method for producing regenerated clay, regenerated clay, and a method for producing purified fats and oils, which have the following characteristics.

(1) A method for producing regenerated clay, the method including the steps of: mixing waste clay that has been used for purification of fats and oils, lower alcohol, and an acidic catalyst; and performing extraction of oily ingredients from the waste clay, and an esterification reaction between the fats and oils and/or a free fatty acid in the oily ingredients and the lower alcohol at the same time so as to regenerate a decolorization capacity of the waste clay.

(2) The method for producing regenerated clay according to (1), wherein 50 to 900 parts by mass of the lower alcohol may be mixed with respect to 100 parts by mass of the waste clay.

(3) The method for producing regenerated clay according to (1) or (2), wherein the extraction of the oily ingredients, and the esterification reaction between the fats and oils and/or the free fatty acid in the oily ingredients and the lower alcohol may be performed at a temperature of 60 to 200° C.

(4) The method for producing regenerated clay according to any one of (1) to (3), wherein a difference between an L* value of the fats and oils, which are purified using the clay of which decolorization capacity is regenerated, and which is determined in accordance with a CIElab method, and an L* value of the fats and oils, which are purified using unused clay, and which is determined in accordance with in the CIElab method may be 2 or less.

(5) The method for producing regenerated clay according to any one of (1) to (3), wherein a difference between a Y value of the fats and oils, which are purified using the clay of which decolorization capacity is regenerated, and which is determined in accordance with a Lovibond colorimeter having a cell length of 5.25 inches, and a Y value of the fats and oils, which are purified using unused clay, and which is determined in accordance with the Lovibond colorimeter may be 25 or less.

(6) The method for producing regenerated clay according to any one of (1) to (5), wherein the ester having an acid value of 10 or less may be obtained by the esterification reaction between the fats and oils and/or the free fatty acid in the oily ingredients and the lower alcohol.

(7) The method for producing regenerated clay according to any one of (1) to (6), wherein the acidic catalyst may be an acid catalyst.

(8) The method for producing regenerated clay according to (7), wherein the acid catalyst may be a sulfuric acid.

(9) The method for producing regenerated clay according to any one of (1) to (8), wherein the lower alcohol may be alcohol having 8 or less carbon atoms.

(10) The method for producing regenerated clay according to any one of (1) to (9), further including: washing the regenerated clay of which decolorization capacity is regenerated with a solvent having an SP value, which indicates a solubility parameter, of 7 to 15, after the extraction of the oily ingredients from the waste clay.

(11) The method for producing regenerated clay according to any one of (1) to (9), further including: adjusting the pH of the regenerated clay of which decolorization capacity may be regenerated to 3 to 8, after the extraction of the oily ingredients from the waste clay; and subsequently washing the regenerated clay with a solvent having an SP value, which indicates a solubility parameter, of 7 to 15 and pH of 3 to 8.

(12) The method for producing regenerated clay according to (10) or (11), wherein the washing of the regenerated clay may be performed at 0 to 200° C.

(13) The method for producing regenerated clay according to (11), further including: removing a salt from the regenerated clay, after washing the regenerated clay with the solvent having the SP value of 7 to 15 and pH of 3 to 8.

(14) The method for producing regenerated clay according to (13), further including: washing the regenerated clay with water, after washing the regenerated clay with the solvent having the SP value of 7 to 15 and pH of 3 to 8.

(15) The method for producing regenerated clay according to any one of (1) to (14), wherein the fats and oils may be vegetable oils.

(16) Regenerated clay that is produced by the method for producing regenerated clay according to any one of (1) to (15).

(17) A method for producing purified fats and oils, the method including the step of decolorizing fats and oils using the regenerated clay according to (16).

Advantageous Effects of Invention

According to the invention, the production of ester from the oily ingredients in the waste clay, and the regeneration of the decolorization capacity of the waste clay may be performed at the same time in a convenient manner. The produced ester may be used as a biofuel, and thus the ester may be thermally recycled in an easy manner. In addition, the decolorization capacity of the waste clay is reproduced. Accordingly, the regenerated clay may be repetitively used in a process of decolorizing the fats and oils, and thus the purchase cost of clay or the disposal cost of the waste clay may be reduced, and the impact on the environment due to the disposal of the clay may be reduced.

DESCRIPTION OF EMBODIMENTS

Figure 1:
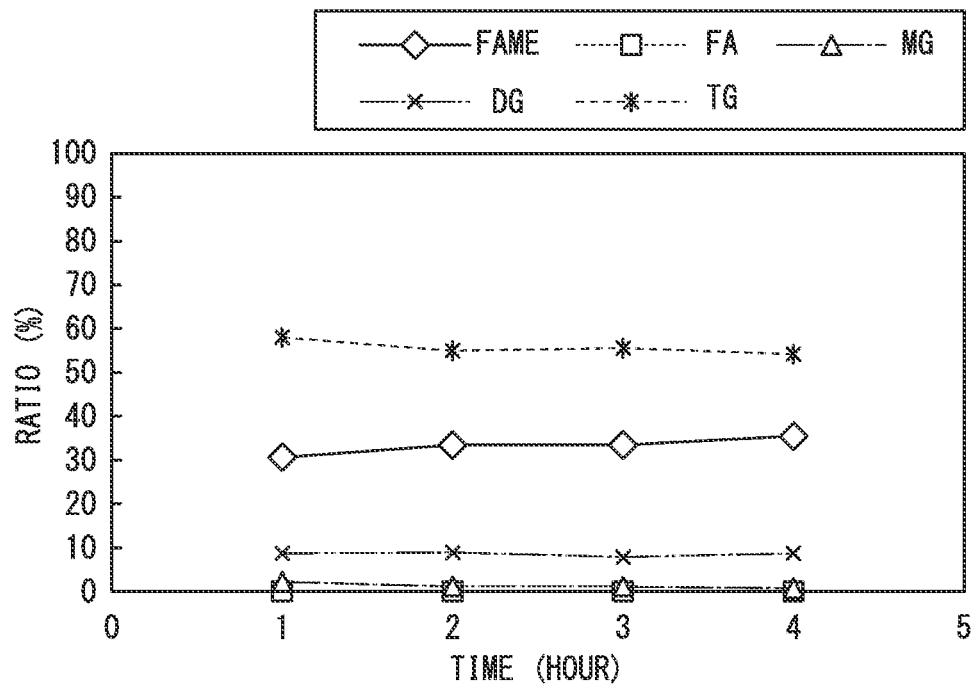
FIG. 1 is a graph illustrating a variation with the passage of time in a ratio of ester that may be obtained by a treatment of Condition 1 in Example 1, a free fatty acid, and fats and oils.

In the invention, "clay" represents one that contains montmorillonite that is a mineral as a main component, and has a decolorization capacity with respect to fats and oils. In this specification, the "clay" includes naturally produced acidic clay, and activated clay that may be obtained by treating the acidic clay with an inorganic acid such as a sulfuric acid and a hydrochloric acid.

In the invention, "waste clay" represents clay that has been used for purification of the fats and oils. A purification method is not particularly limited, and a method, which is described in a method for producing purified fats and oils described later, may be used.

In the invention, the "fats and oils" represents ester (i.e., glycerin-fatty acid ester; fatty acid glyceride) of a fatty acid and glycerin. The fats and oils in the invention is not particularly limited as long as the fats and oils contains fatty acid glyceride, and examples thereof include fats and oils that are extracted from vegetable materials such as soybean, sesame, oilseed rape, safflower, sunflower, and corn, and fats and oils that are extracted from animal materials such as fishes and meats. Among these, it is preferable that the fats and oils in the invention be vegetable oil that is extracted from vegetable materials. In addition, as the fats and oils in the invention, fats and oils, which have been subjected to a deacidification process of removing a free acid with an alkali in advance, are preferable, but the fats and oils may contains a little amount of free acid or other impurities.

[Method for Producing Regenerated Clay]

In a method for producing regenerated clay of the invention, the waste clay, and lower alcohol, and an acidic catalyst are mixed with each other, and extraction of oily ingredient from the waste clay is performed to regenerate a decolorization capacity of the waste clay.

In addition, in the method for producing the regenerated clay of the invention, an esterification reaction between the fats and oils and/or a free fatty acid in the oily ingredients and the lower alcohol is performed at the same time with the regeneration of a decolorization capacity.

When the waste clay and the lower alcohol are mixed with each other, since the oily ingredients and coloring matters that are present in pores of the waste clay are extracted and thus the decolorization capacity of the waste clay is regenerated, the clay may be used again for purification of the fats and oils, and the like. In addition, since the decolorization process and the regeneration of the decolorization capacity are repeated, the clay may be repetitively used.

In addition, since the acidic catalyst is further mixed to the waste clay and the lower alcohol, the esterification reaction between the fats and oils and/or the free fatty acid that are contained in the oily ingredients extracted from the waste clay, and the lower alcohol occurs at the same time with the regeneration of the decolorization capacity of the waste clay. Due to this esterification reaction, ester of the fatty acid and the lower alcohol may be obtained from the fats and oils and/or the free fatty acid. Since the lower fatty acid ester, which may be obtained from the esterification, has viscosity lower than that of fats and oils, the lower fatty acid ester is suitable for usage such as a fuel.

In addition, in the invention, the esterification reaction represents both (1) a reaction in which main chains of the fats and oils (i.e., glycerin-fatty acid ester) and the lower alcohol are directly exchanged with each other, and the fatty acid ester of the lower alcohol is generated, and (2) a reaction in which the free fatty acid including a product generated due to decomposition of the glycerin-fatty acid ester and the lower alcohol are esterified, and fatty acid ester of the lower alcohol is generated.

In the invention, the lower alcohol represents alcohol having 11 or less carbon atoms. In the invention, only one kind of lower alcohol may be used, or a mixture of two or more kinds of lower alcohol may be used.

The lower alcohol may be a straight-chain type or a branched-chain type and may be monovalent or bivalent or more. For example, straight-chain monovalent alcohol such as methanol, ethanol, 1-propanol, 1-butanol, 1-pentanol, and 1-hexanol, and branched-chain monovalent alcohol such as 2-propanol and 2-butanol may be exemplified.

Among these, it is preferable that the lower alcohol in the invention be monovalent alcohol. The lower alcohol in the invention is preferably a straight-line type, and it is preferable that the number of carbon atoms be 8 or less, more preferably 6 or less, and still more preferably 3 or less. As the lower alcohol, specifically, methanol, ethanol, 1-propanol, or a mixture thereof is preferable, methanol, ethanol, or a mixture of methanol and ethanol is more preferable. Since edible fats and oils may be purified using the regenerated clay, ethanol, which may be used for foods, is still more preferable.

Although not particularly limited, it is preferable that a used amount of the lower alcohol be 50 to 900 parts by mass on the basis of 100 parts by mass of waste clay, more preferably 100 to 900 parts by mass, and still more preferably 200 to 900 parts by mass. There is no problem even when the used amount of the lower alcohol is much from the viewpoint of regeneration capacity, and 400 to 900 parts by mass is still more preferable. On the other hand, from the viewpoints of waste liquid disposal and cost, it is preferable that the used amount of the lower alcohol be not excessive, more preferably 200 to 400 parts by mass, and still more preferably 200 to 300 parts by mass. When the used amount of the lower alcohol is set to 50 parts by mass or more on the basis of 100 parts by mass of the waste clay, a probability in which the lower alcohol and the waste clay come into contact with each other increases, and thus the esterification may be performed in a relatively suitable manner. In addition, in a case where a solvent and the like as components other than the waste clay, the lower alcohol, and the acidic catalyst are not used, when the lower alcohol is 50 parts by mass on the basis of 100 parts by mass of the waste clay, the lower alcohol also functions as the solvent, and thus the waste clay, the lower alcohol, and the catalyst are suitably mixed with each other, and may frequently come into contact with each other.

The lower alcohol that is used in the invention may have purity of 100%, and may include other solvents such as water and have lower purity. For example, it is preferable that the purity of the lower alcohol that is used in the invention be 50 to 100%, more preferably 90 to 100%, and still more preferably 90 to 96%. The lower alcohol having higher purity is preferable because the total amount of waste liquid may be further suppressed. On the other hand, in a case of using the lower alcohol having purity of 100%, the free fatty acid is not likely to be contained in the oily ingredients that are extracted from the waste clay, and in a case of using the lower alcohol having purity of 90 to 96%, there is a tendency for the free fatty acid to be contained in the oily ingredients, which are extracted, in an amount of approximately 5%.

In the invention, the acidic catalyst is not particularly limited as long as the esterification reaction is satisfactory performed. Commonly, a catalyst, which is used as a catalyst for an ester exchange reaction or an esterification reaction, may be used. The acidic catalyst that is used in the invention may be an acid catalyst or an acidic solid catalyst. Specific examples of the acid catalyst include inorganic acids such as a sulfuric acid, a hydrofluoric acid, and a nitric acid, and organic acids such as a phosphoric acid and a sulfonic acid. Specific examples of the acidic solid catalyst include solid acid catalysts such as an ion exchange resin, zeolite, and silicon dioxide composite, and the like. In the invention, only one kind of acidic catalyst may be used, or two or more kinds of acidic catalyst may be used in an appropriate combination. Among these, it is preferable that the acidic catalyst in the invention be an acid catalyst, and a sulfuric acid, a sulfonic acid, a mixture of the sulfuric acid and the sulfonic acid, or a combination of each of these and another acidic catalyst is preferable. In addition, the sulfuric acid is preferable from the viewpoint of economical efficiency.

Although not particularly limited, it is preferable that a used amount of the acidic catalyst be 0.1 to 100 part by mass on the basis of 100 parts by mass of the waste clay, more preferably 0.5 to 80 parts by mass, still more preferably 1 to 40 parts by mass, and still more preferably 2 to 10 parts by mass. When the used amount of the acidic catalyst is set within the above-described range, the esterification reaction between the fats and oils and/or the free fatty acid, and the lower alcohol is suitably promoted.

A method for mixing the waste clay, the lower alcohol, and the acidic catalyst is not particularly limited, and for example, all of the waste clay, the lower alcohol, and the acidic catalyst may be mixed with each other at the same time, or the lower alcohol and the sulfuric acid may be sequentially added to the waste clay to be mixed with each other. In addition, it is preferable that the waste clay be cut or ground before the mixing so as to improve reactivity due to homogenization or miniaturization.

In addition, in the method for producing the regenerated clay of the invention, other components may be further mixed in addition to the waste clay, the lower alcohol, and the acidic catalyst. Other components are not particularly limited as long as they do not deteriorate the extraction of the oily ingredients or the esterification reaction, and examples of other components include a promoter and a solvent. Examples of the promoter include thionyl chloride, sodium citrate, dimethylacetal, a metal catalyst, salts of these, and the like. Examples of the metal catalyst include zinc, aluminum, tin, and the like. Examples of the solvent include xylene, toluene, acetone, hexane, and the like.

The extraction of the oily ingredients from the waste clay, and the esterification reaction between the fats and oils and/or free fatty acid in the oily ingredients, and the lower alcohol may be performed by mixing the waste clay, the lower alcohol, and the acidic catalyst. However, it is preferable to stir the waste clay, the lower alcohol, and the acidic catalyst that are mixed with each other using a dispersion machine, a homomixer, a stirrer, a propeller, or the like while warming the resultant mixture so as to further promote the extraction and the esterification reaction. In addition, it is preferable that a warming temperature be 60 to 200° C., more preferably 60 to 130° C., and still more preferably 60 to 100° C.

A time for performing the extraction of the oily ingredients and the esterification reaction is not particularly limited, and may be appropriately determined depending on an amount or quality of the waste clay, the warming temperature, or the like. In addition, an amount of generation of the fatty acid ester of the lower alcohol, which is generated by the esterification reaction, may be analyzed using a known apparatus such as a gas chromatography and a reaction time may be preferably determined according to the amount of generation. There is a tendency for an amount of the extracted oily ingredients to increase depending on the reaction time, but it is preferable that the reaction time be 12 hours or less, more preferably 1 to 8 hours, still more preferably 2 to 8 hours, and still more preferably 3 to 8 hours, for example, from the viewpoint of economic efficiency.

The reaction solution after performing the extraction and the esterification reaction as described above may be subjected to solid-liquid separation by a method such as filtration to separate solid clay (regenerated clay), whose decolorization capacity is regenerated, from the reaction solution. The regenerated clay that is obtained may be used again for the decolorization of the fats and oils as is or after performing a treatment such as drying.

In addition, the liquid portion, which is separated by the solid-liquid separation, may contain the ester of the fats and oils and/or the free fatty acid and the lower alcohol, glycerol that is a reaction by-product, the catalyst, a minute amount of free fatty acid or glycerin-fatty acid ester according to circumstances. When a sulfuric acid is removed from the obtained liquid portion according to a method in the related art such as neutralization, water-washing, and adsorption, the reaction solution may be used as a fuel. The reaction solution from which the sulfuric acid is removed contains ester of the lower alcohol as a main component, and thus viscosity is low and may be suitably used as a fuel.

In addition, in the method for producing the regenerated clay of the invention, the ester, which is obtained by the esterification reaction between the fats and oils and the lower alcohol, may be used for a fuel or the like. For example, in the method for producing the regenerated clay of the invention, as the lower alcohol that is used for the extraction of the oily ingredients, when lower alcohol having high purity is used, an acid value of the ester, which is obtained, may be set to 10 or less. The ester that is obtained in this manner and has an acid value of 10 or less may be used, for example, as a biofuel and the like.

The regenerated clay, which is separated from the reaction solution obtained after performing the extraction and the esterification reaction, may be further washed with a solvent having an SP value, which indicates a solubility parameter, of 7 to 15. The extracted oily ingredients that are attached to the regenerated clay, a product of the esterification reaction, and the like may be washed and removed by the washing treatment. It is preferable that the solvent (hereinafter, referred to as a solvent for washing and removing oily ingredients) having the SP value of 7 to 15 be lower alcohol that is used for the extraction and the esterification reaction in consideration of solvent separation. On the other hand, since the oily ingredients that remain after the regeneration treatment may be washed in a relatively efficient manner, a solvent such as xylene, toluene, acetone, and hexane that have the SP value of 7 to 10, alcohol such as isopropanol, ethanol, and methanol that have the SP value of 11 to 15, and a mixture of these may be used.

When the mixture of the waste clay, the acidic catalyst, and the lower alcohol after the extraction treatment is filtered, and the resultant filtered material is washed with 200 parts by mass of water on the basis of 100 parts by mass of the regenerated clay that is obtained, the pH of washing wastewater depends on the kind or amount of the acidic catalyst that is added, but the pH is approximately 1 to 3. Therefore, in a case where the method for producing regenerated clay of the invention is carried out in an industrial facility, a facility such as a drain pipe, which discharges the wastewater generated by the washing treatment of the regenerated clay, is limited to a facility formed from a material having high acid resistance. Accordingly, after the extraction treatment, when the washing treatment is performed after the regenerated clay is neutralized, the pH of the wastewater that is discharged may be increased. As a result, the range of options of a material that constructs the facility such as the drainpipe may be expanded.

However, it is preferable that the pH be lower in an aspect of the decolorization capacity of the regenerated clay. In addition, when the pH of the regenerated clay increases, in a case of using the acid catalyst for the extraction treatment, a salt, which is generated from remaining acid catalyst due to neutralization, is apt to adhere to the regenerated clay. Therefore, in the invention, the solid-liquid separation is preferably performed after an alkali is added to the reaction solution, which is obtained after performing the extraction and the esterification reaction, to adjust the pH to 3 to 8, preferably 3.5 to 6, more preferably 3.5 to 5.5, and still more preferably 4 to 5, and then the washing treatment using a removal solvent is preferably performed with respect to the obtained solid (i.e., the regenerated clay). The alkali that is used for the adjustment of pH is not particularly limited. Examples thereof include sodium hydroxide, sodium carbonate, and the like.

An amount of the solvent for washing and removing the oily ingredients, which is used for washing the regenerated clay, is not particularly limited regardless of the neutralization treatment, but from the viewpoint of economic efficiency of the waste water disposal, it is preferable that the amount of the solvent be 1,000 parts by mass or less for each washing treatment on the basis of 100 parts by mass of the regenerated clay to be washed (that is, 100 parts by mass of the waste clay that is provided for the regeneration), more preferably 10 to 1,000 parts by mass, still more preferably 50 to 1,000 parts by mass, and still more preferably 100 to 1,000 parts by mass. In addition, the number of times of the washing treatment is not particularly limited, but for example, 1 to 10 times with the above-described amount of the solvent, preferably 1 to 5 times, still more preferably 1 to 4 times, and still more preferably 1 to 3 times.

In addition, a temperature at which the washing treatment of the regenerated clay is performed to wash and remove the oily ingredients is not particularly limited, and may be equal to or lower than the boiling point of the solvent that is used to wash and remove the oily ingredients. Specifically, for example, the temperature may be set to 0 to 200° C. In a case of not performing the neutralization treatment, since temperature adjustment is not necessary, the temperature is preferably set to room temperature. In a case of performing the neutralization treatment, the washing is preferably performed at a temperature higher than room temperature, for example, 40 to 60° C. The regenerated clay obtained after performing the washing using the solvent for washing and removing the oily ingredients may be dried as is, or may be dried after being washed with water or the like.

In the case of performing the neutralization treatment, since the salt that is generated due to the neutralization is apt to adhere to the regenerated clay, it is preferable to perform a treatment for removing the salt from the regenerated clay obtained after the washing treatment using the solvent for washing and removing the oily ingredients. Specifically, the regenerated clay after the washing treatment using the solvent for washing and removing the oily ingredients is washed with a solution such as water capable of dissolving the salt. An amount of the washing solution that is used for each washing, the number of washing times, and the washing temperature are not particularly limited. However, the larger the amount of the washing solution is and the larger the number of washing times is, the larger an amount of wastewater becomes, but the regenerated clay having a high decolorization capacity may be obtained. The washing temperature may be appropriately adjusted according to solubility of the salt, which is generated due to the neutralization, in the washing solution. For example, with regard to a salt such as sodium sulfate in which the peak of the solubility appears at 34.38° C. and a salt such as cerium sulfate in which the solubility at a low temperature near 0° C. is high and the solubility decreases as the temperature increases, it is preferable to perform the washing at a temperature at which the solubility of the salts becomes sufficiently high. In addition, in a lot of salts, the solubility has a tendency to increase at a temperature higher than room temperature, and in this case, it is preferable to perform the washing at a temperature higher than room temperature.

A difference between an $L^*$ value of the fats and oils, which are purified using the clay of which decolorization capacity is regenerated by the method for producing the regenerated clay of the invention, in a CIElab method, and an $L^*$ value of the fats and oils, which are purified under the same conditions except that the regenerated clay is substituted with unused clay, in the CIElab method is preferably 2 or less. In addition, various kinds of clay are present, but when comparing the difference in the $L^*$ value of the fats and oils, the comparison is made with respect to fats and oils that are purified using the same kind of clay (preferably, the same clay) having a difference with regard to whether or not the regeneration treatment according to the method for producing the regenerated clay of the invention is present. This is true of the following comparison of a Y value.

More specifically, for example, in a case where 100 g of soybean oil, from which an acid is removed, for example, by a common deacidification process and which exhibits the $L^*$ value of 90 in the CIElab method, is decolorized with 1 g of unused clay, the $L^*$ value of the decolorized soybean oil, which is obtained, in the CIElab method becomes 98.5 to 99. On the other hand, in a case where 100 g of the soybean oil, which is subjected to the same deacidification treatment, is decolorized using 1 g of the clay which is obtained as described above and of which the decolorization capacity is regenerated, the $L^*$ value of the decolorized soybean oil that is obtained in the CIElab method becomes 97 to 99.

The $L^*$ value in the CIElab method represents luminosity of an object. The larger the value is, the higher luminosity becomes. That is, when the difference in the $L^*$ value is 2 or less, this represents that even when the regenerated clay is used, the same decolorization of the fats and oils as the unused clay is accomplished.

In the invention, the difference between the $L^*$ value of the fats and oils that are purified using the clay that is regenerated, and the $L^*$ value of the fats and oils that are purified using the unused clay in the CIElab method is preferably 2 or less, more preferably 1.6 or less, still more preferably 0.8 or less, and still more preferably 0.4 or less.

In addition, all of the $L^*$ values in the CIElab method are values obtained by performing a measurement by a spectroscopic colorimeter SD5000 (trade name, manufactured by Nippon Denshoku Co., LTD.; a length of an optical path: 10 mm).

In addition, a Y value of the facts and oils, which are purified using the clay of which decolorization capacity is regenerated according to the method for producing the regenerated clay of the invention, in a Lovibond colorimeter (cell length: 5.25 inches) (trade name: Model E, manufactured by Tintometer GmbH), is smaller than that of the fats and oils before the purification, and is close to a Y value of the fats and oils that are purified under the same conditions except that the regenerated clay is substituted with unused clay. The Y value of the Lovibond colorimeter represents intensity of a yellow color of the object. The smaller the value is, the further it closes to colorlessness. In the invention, a difference between the Y value of the fats and oils that are purified using the clay that is regenerated, and the Y value of the fats and oils that are purified under the same conditions except that the regenerated clay is substituted with unused clay in the Lovibond colorimeter is preferably 25 or less, more preferably 21 or less, still more preferably 12 or less, and still more preferably 5 or less.

[Regenerated Clay]

The regenerated clay of the invention is clay that is produced by the method for producing the regenerated clay, and the regenerated clay may be used again in a process of decolorizing the fats and oils. In addition, the regenerated clay that is used to decolorize the fats and oils may be used again to regenerate the decolorization capacity by using the method for producing the regenerated clay of the invention, and thus the clay may be continuously used for the regeneration of the decolorization capacity and the decolorization process of the fats and oils.

The number of times of the regeneration of the decolorization capacity is not particularly limited, but for example, the regeneration of the waste clay and the decolorization of the fats and oils using the regenerated clay by the method for producing the regenerated clay of the invention may be repeated 1 to 20 times, preferably 1 to 10 times, more preferably 1 to 5 times, and still more preferably 1 to 3 times.

[Method for Producing Purified Fats and Oils]

The method for producing the purified fats and oils of the invention includes a process of decolorizing the fats and oils using the regenerated clay (hereinafter, referred to as a "decolorization process").

The fats and oils that are used in the decolorization process are the same as the fats and oils in the invention, and fats and oils from which a free fatty acid or an impurity are removed in advance by a deacidification process is preferable.

A method of decolorizing the fats and oils in the decolorization process is not particularly limited, and examples thereof include a method in which the fats and oils and the clay are brought into contact with each other and are stirred to decolorize the fats and oils.

When a dewaxing process or a deodorization process is performed with respect to the fats and oils that are decolorized by the decolorization process according to necessity, purified fats and oils may be produced. The dewaxing process and the deodorization process are not particularly limited, and may be performed by a common method for producing edible oil.

EXAMPLES

Hereinafter, examples and comparative examples will be illustrated and the invention will be described in more detail, but the invention is not limited thereto.

Example 1

Examination was made with respect to an amount of fatty acid ester of the lower alcohol, an extracted amount of the fats and oils, and the decolorization capacity of the regenerated clay, which was obtained, according to a usage ratio of the lower alcohol with respect to the waste clay.

<<Condition 1>>

First, a stirrer (POWER STIRRER AMGH (trade name), manufactured by ASH), a thermometer holder, and a glass cover were provided to a four-mouth flask. Next, waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoloriztaion process) was homogenized using a mortar, and 75 g of the waste clay, 75 g of methanol, and 1.5 g of a sulfuric acid were put into the flask.

A Dimorth cooler was connected to the flask, a temperature of a water bath was set to 75° C., and stirring was performed. A point of time at which a reflux of methanol was confirmed was set to a reaction initiation time. With regard to a stirring speed, gradations on the stirrer were set to 3.5, and a reaction time was set to 4 hours. In addition, after one hour from the reaction initiation, samples for gas chromatography were collected every hour a total of four times.

After the reaction was terminated, each of the samples was separated into a solid portion and a liquid portion using an eggplant-shaped flask and Buchner funnel whose tare was measured in advance. When performing the separation, the inside of the four-mouth flask and a perforated plate of the Buchner funnel were washed using methanol, and the washing continued until the liquid portion flowing out of the solid portion became transparent. Then, the funnel and the four-mouth flask were left as is for one hour in a thermostatic bath of 80° C. to evaporate the methanol, and a weight of the solid portion that remained was measured. In addition, a material, which was obtained by performing evaporation with respect to the egg-plant shaped flask to remove methanol, was set to the liquid portion, and the weight thereof was measured.

Measurement results are shown in Table 1.

<<Condition 2>>

A solid portion and a liquid portion were obtained by performing the reaction while collecting samples for gas chromatography in the same manner as Condition 1 except that 15 g of the waste clay, 135 g of the methanol, and 1.5 g of the sulfuric acid were used. Weights of the solid portion and the liquid portion are shown in Table 1.

TABLE 1

|  | Weight of solid portion | weight of liquid portion | Total weight |
| --- | --- | --- | --- |
| Condition 1 | 52.51 g | 15.7 g | 68.24 g |
| Condition 2 | 9.34 g | 9.49 g | 18.83 g |

(Gas Chromatography Analysis)

Among the samples for gas chromatography whose sampling was performed during the reaction, approximately 30 mg at Condition 1 and approximately 200 g at Condition 2 were transferred into a screw cap-attached test tube, respectively, 1 ml of hexane and 2 ml of saturated saline were added to each sample in the test tube, and each resultant mixture was mixed. Then, the resultant mixture was centrifugally separated and was divided into two layers. A hexane layer was transferred into a sample vial, and was set to a sample for gas chromatography. Gas chromatography was performed using the sample under the following conditions, and peaks that were obtained were classified into fatty acid methyl ester (FAME), free fatty acid (FA), monoglyceride (MG), diglyceride (DG), and triglyceride (TG), respectively. Then, each compositional ratio was calculated from a ratio of each peak area with respect to the total peak area. Results of Condition 1 are shown in Table 2 and FIG. 1, and results of Condition 2 are shown in Table 3 and FIG. 2.

Column: DB-5ht (15 m) (manufactured by Agilent Technologies).
Carrier: Helium, hydrogen.
Flow rate of helium: 50 ml/minute.
Flow rate of hydrogen: 50 ml/minute.
Flow rate of air: 500 ml/minute.
Temperature of vaporizing chamber: 300° C.
Temperature of detector: 350° C.
Temperature rising conditions: 100° C. (for one minute) →temperature rising at 10° C./minute→350° C. (for 20 minutes)
Amount of introduction: 1 µL.
Split ratio: 50.

TABLE 2

| | Condition 1 | | | |
| --- | --- | --- | --- | --- |
| | After one hour | After two hours | After three hours | After four hours |
| FAME | 31.5 | 34.1 | 34.8 | 36.3 |
| FA | 0 | 0 | 0 | 0 |
| MG | 1.8 | 1.4 | 1.1 | 0.9 |
| DG | 8.6 | 8.6 | 8.4 | 8.3 |
| TG | 58.0 | 55.9 | 55.7 | 54.5 |
| Total | 100 | 100 | 100 | 100 |

TABLE 3

| | Condition 2 | | | |
| --- | --- | --- | --- | --- |
| | After one hour | After two hours | After three hours | After four hours |
| FAME | 70.8 | 86.4 | 94.6 | 97.7 |
| FA | 0 | 0 | 0 | 0 |
| MG | 4.1 | 3.2 | 1.6 | 0.7 |
| DG | 10.2 | 5.8 | 2.7 | 1.4 |
| TG | 15.0 | 4.6 | 1.2 | 0.3 |
| Total | 100 | 100 | 100 | 100 |

Figure 2:
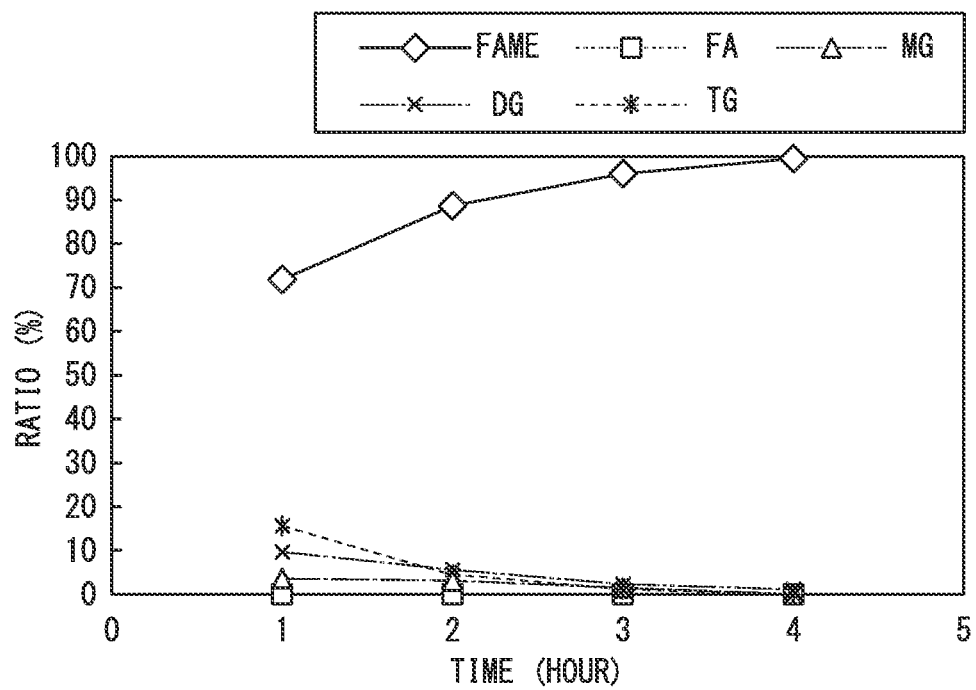
FIG. 2 is a graph illustrating a variation with the passage of time in a ratio of ester that may be obtained by a treatment of Condition 2 in Example 1, a free fatty acid, and fats and oils.

In the results of FIGS. 1 and 2, and Tables 2 and 3, the free fatty acid was not detected at all of Conditions 1 and 2. It was considered that methyl esterification occurred at substantially the total amount of the free fatty acid that was decomposed during the reaction.

In addition, at Condition 1, a ratio of the triglyceride decreased with the passage of time, and the fatty acid methyl ester (FAME) increased in correspondence with the decrease. At Condition 2, all of the triglyceride (TG), the diglyceride (DG), and the monoglyceride (MG) were decomposed and decreased with the passage of time, and the fatty acid methyl ester (FAME) increased.

(With Regard to Extracted Amount of Fats and Oils)

The total area of the peaks, which were obtained from the gas chromatography analysis chart, was divided by a sampling amount to calculate an extracted amount of the fats and oils. Results are shown in FIG. 3 (Condition 1) and FIG. 4 (Condition 2).

Figure 3:
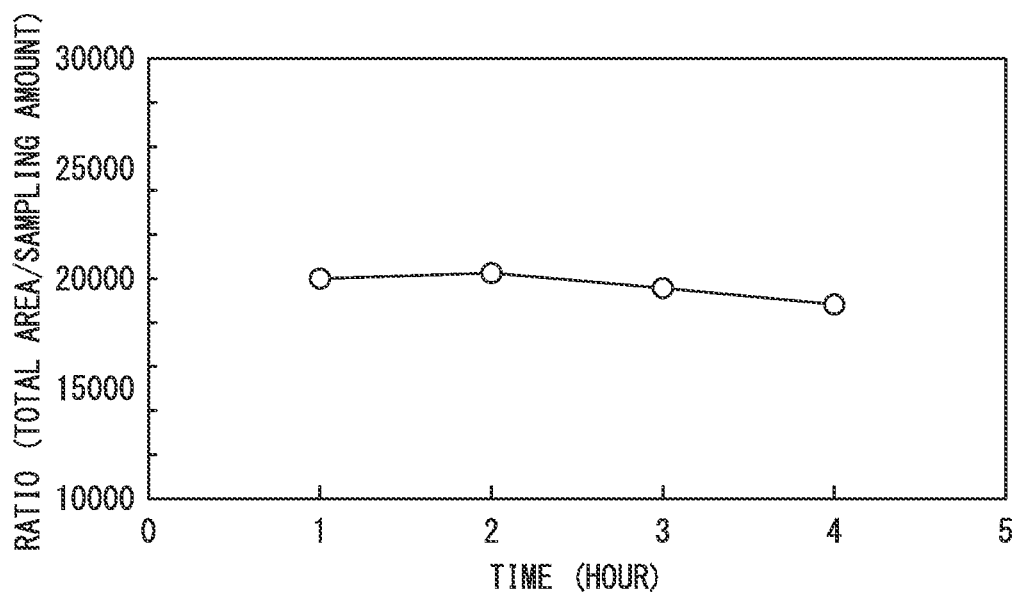
FIG. 3 is a graph illustrating a variation with the passage of time in an amount of fats and oils that are extracted by the treatment of Condition 1 in Example 1.
Figure 4:
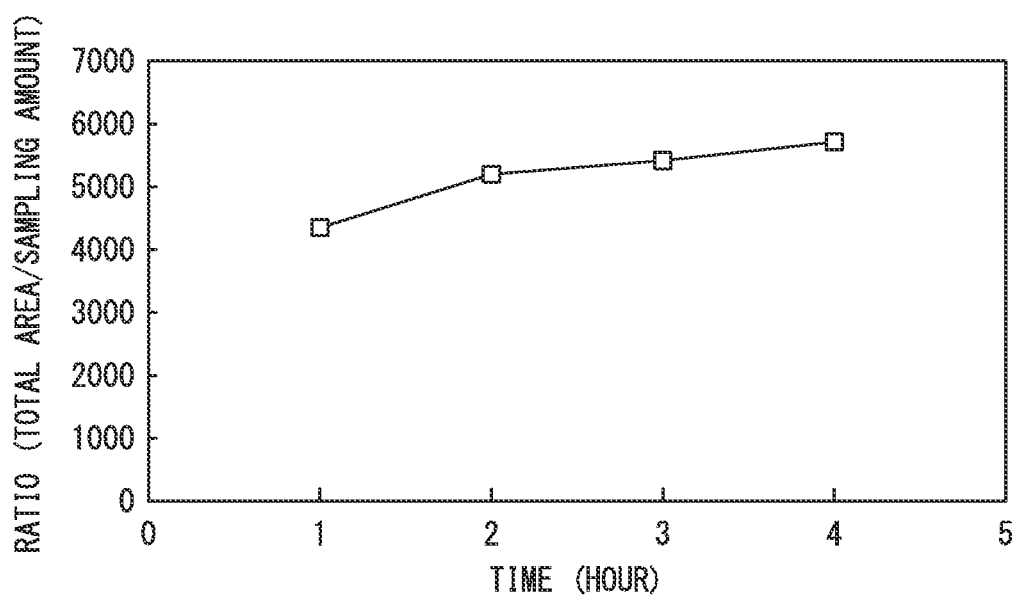
FIG. 4 is a graph illustrating a variation with the passage of time in an amount of fats and oils that are extracted by the treatment of Condition 2 in Example 1.

From results of FIGS. 3 and 4, it could be seen that the extracted amount of the fats and oils did not vary with the passage of time at Condition 1, and on the other hand, the extracted amount of the fats and oils increased with the passage of time at Condition 2. At Condition 2, it was implied that there was a possibility of further increasing the extracted amount of the fats and oils by setting relatively longer extraction time.

(With Regard to Decolorization Capacity of Regenerated Clay)

Examination on the decolorization capacity of the regenerated clay was performed using the solid portion (the regenerated clay) that was obtained as described above.

Specifically, a stirring rod, a stirrer, and a thermometer holder were provided to a four-mouth flask, and 100 g of the deacidified soybean oil was put into the flask. 1 g of any one of the regenerated clay that was obtained by Condition 1 or Condition 2 and unused clay (GALLEON EARTH (trade name, manufactured by MIZUSAWA INDUSTRIAL CHEMICALS, LTD.) was put into the flask, and the decolorization reaction was carried out for one hour at 105° C. under reduced pressure while performing stirring using the stirrer. In addition, the unused clay colored white, the regenerated clay that was obtained by Condition 1 colored dark gray, the regenerated clay that was obtained by Condition 2 colored slight gray, and the clay that was used and was not regenerated colored black. In addition, when comparing the regenerated clay of Condition 1 and the regenerated clay of Condition 2, Condition 1 felt heavier than Condition 2. The reason for this was guessed to be because oily ingredients remained inside the regenerated clay of Condition 1.

Figure 5:
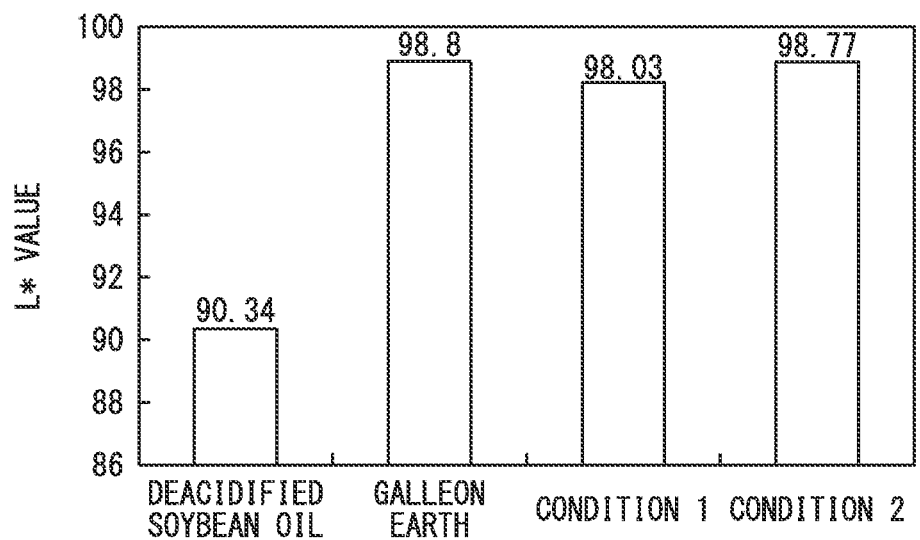
FIG. 5 is a graph illustrating an L* value which is determined in accordance with a CIElab method of fats and oils that are subjected to a decolorization process using unused clay or clay regenerated by the treatment of Condition 1 or Condition 2, or non-decolorized fats and oils in Example 1.
Figure 6:
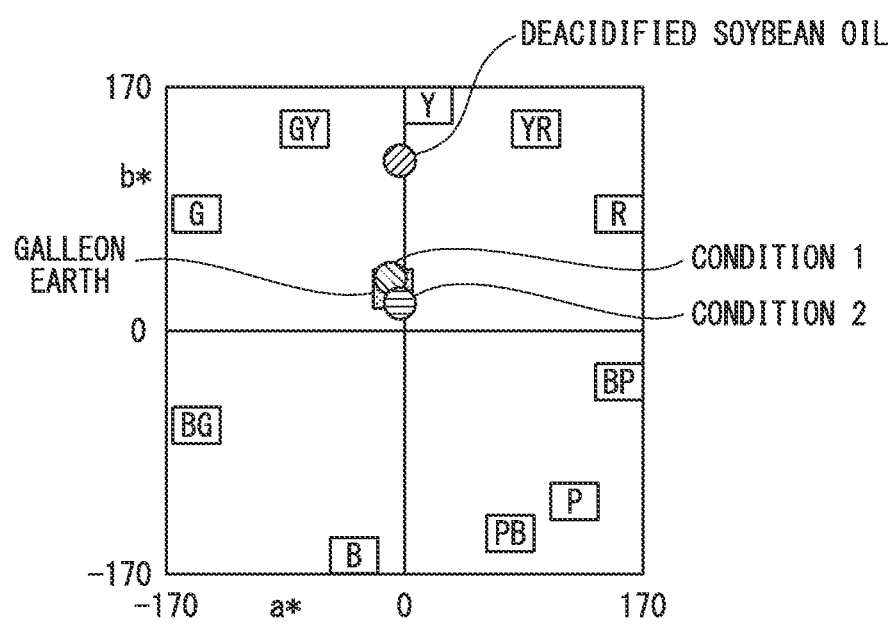
FIG. 6 is a diagram obtained by plotting an a* value and a b* value in the CIElab method of the fats and oils that are subjected to the decolorization process using the unused clay or the clay regenerated by the treatment of Condition 1 or Condition 2, or the non-decolorized fats and oils in Example 1.

Then, fats and oils were extracted by filtration, and measurement of colors of the fats and oils, which were obtained by spectroscopic colorimeter SD5000 (trade name, manufactured by Nippon Denshoku Co., LTD.; a length of an optical path: 10 mm), was performed with CIElab made as an evaluation standard. Color measurement results are shown in FIG. 5 ($L^*$ value) and FIG. 6 ($a^*$ value and $b^*$ value).

First, with regard to the appearance of the fats and oils before and after the decolorization process, the fats and oils before the decolorization process colored amber, and the fats and oils after the decolorization process using the regenerated clay of Conditions 1 or 2 or unused clay colored yellow. However, when comparing Condition 1 and Condition 2, Condition 1 slightly colored red.

Next, with regard to results of the $L^*$ value of CIElab, it could be confirmed that the $L^*$ value of the fats and oils (deacidified soybean oil) before the decolorization was 90.34, the $L^*$ value of the fats and oils after being decolorized with unused clay (GALLEON EARTH (trade name, manufactured by MIZUSAWA INDUSTRIAL CHEMICALS, LTD.) was 98.8, the $L^*$ value of the fats and oils after being decolorized with the regenerated clay of Condition 1 was 98.03, and the $L^*$ value of the fats and oils after being decolorized with the regenerated clay of Condition 2 was 98.77. From these results, it could be confirmed that in the case of using the regenerated clay of Condition 1 or 2, luminosity of the decolorized fats and oils that were obtained increased equivalently to the case of using the unused clay.

Furthermore, from the results of the $a^*$ value and the $b^*$ value of CIElab, in the case of using the regenerated clay of Conditions 1 or 2, it could be confirmed that hue and chroma were provided similarly to the case of using the unused clay.

Example 2

Examination was made with respect to an amount of fatty acid ester of the lower alcohol according to a usage ratio of the lower alcohol with respect to the waste clay.

<<Condition 1>>

The reaction was carried out while collecting samples for gas chromatography in the same manner as Condition 1 except that waste clay, ethanol (having purity of 99.5% or higher), and sulfuric acid in amounts shown in Table 4 were used, and weights of a solid portion and a liquid portion were measured. Results are shown in Table 4.

Figure 7:
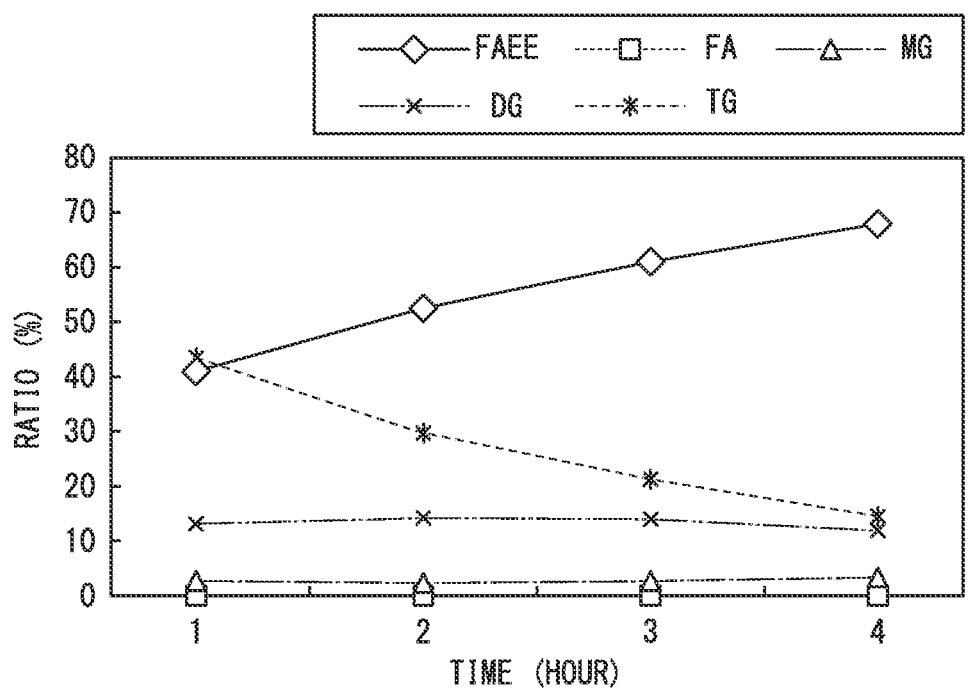
FIG. 7 is a graph illustrating a variation with the passage of time in a ratio of ester that may be obtained by a treatment of Condition 1 in Example 2, a free fatty acid, and fats and oils.
Figure 8:
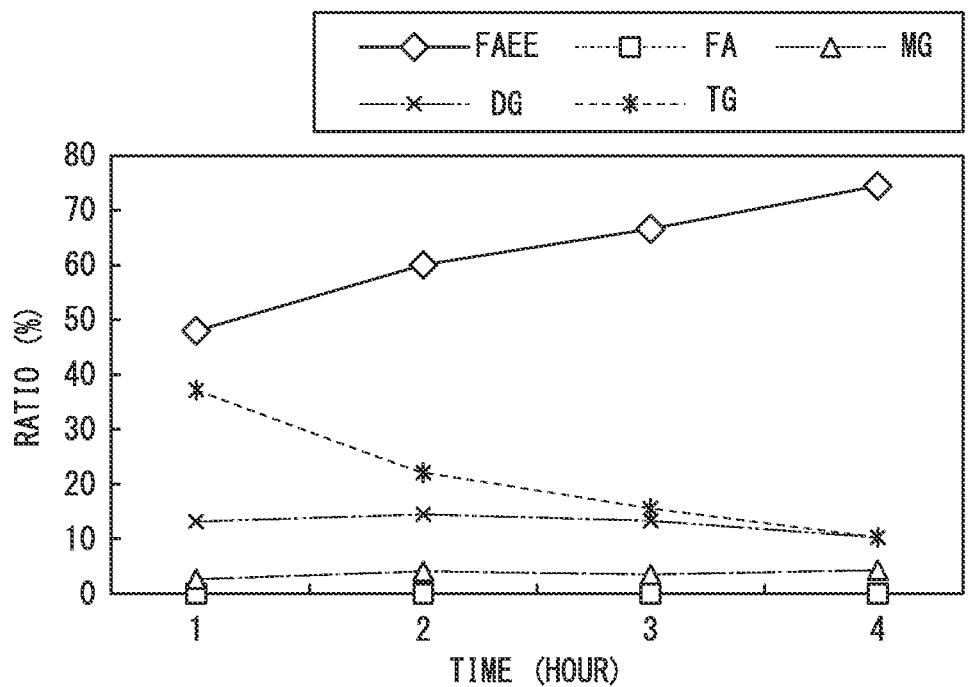
FIG. 8 is a graph illustrating a variation with the passage of time in a ratio of ester that may be obtained by a treatment of Condition 2 in Example 2, a free fatty acid, and fats and oils.
Figure 9:
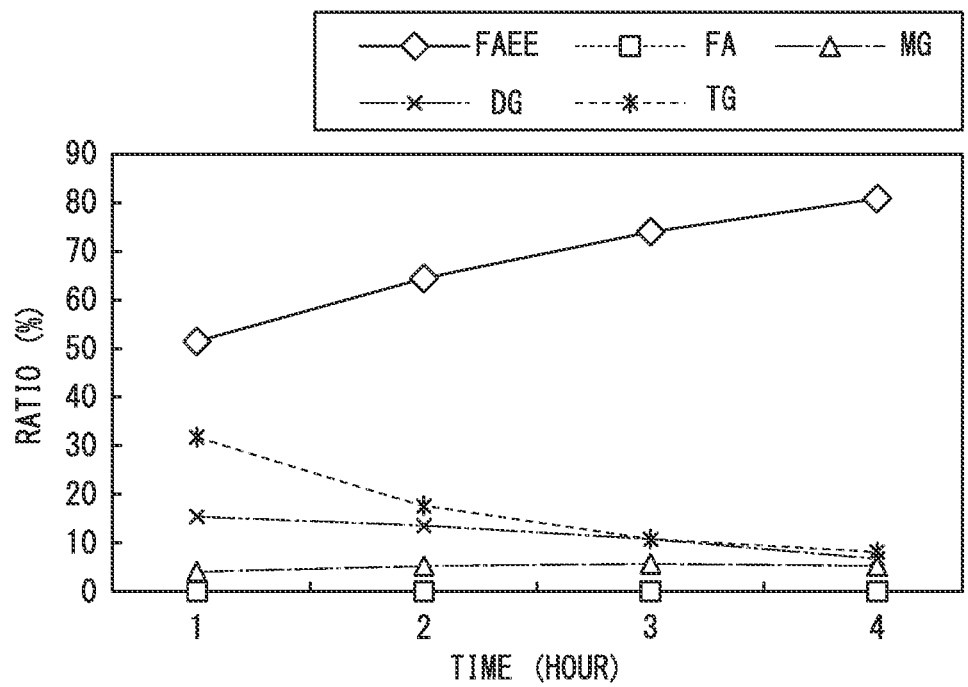
FIG. 9 is a graph illustrating a variation with the passage of time in a ratio of ester that may be obtained by a treatment of Condition 3 in Example 2, a free fatty acid, and fats and oils.
Figure 10:
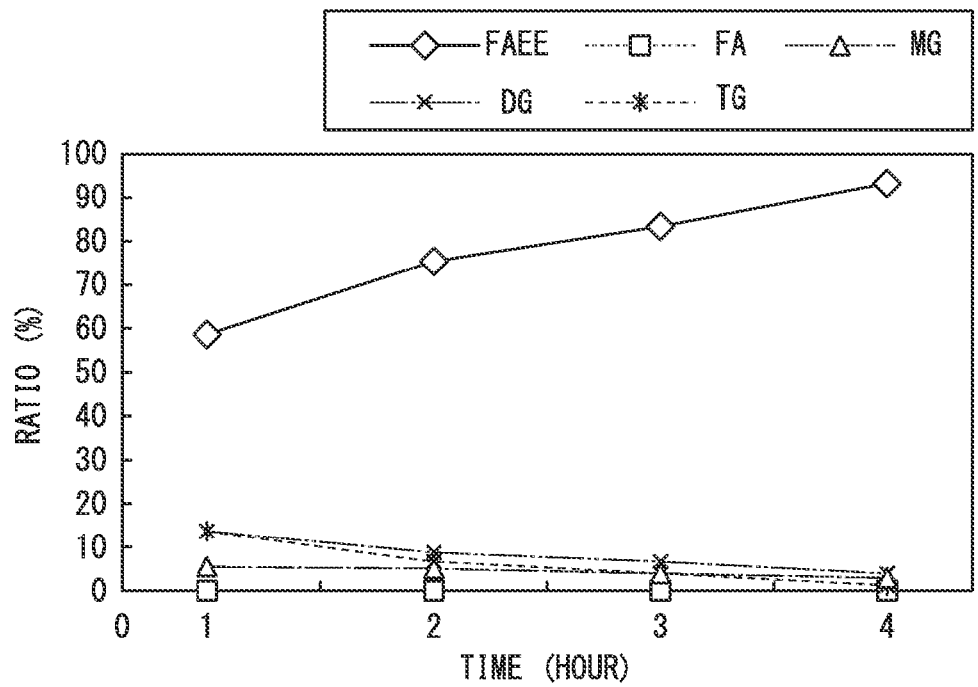
FIG. 10 is a graph illustrating a variation with the passage of time in a ratio of ester that may be obtained by a treatment of Condition 4 in Example 2, a free fatty acid, and fats and oils.

Peaks that were obtained by the gas chromatography were classified into fatty acid ethyl ester (FAEE), free fatty acid (FA), monoglyceride (MG), diglyceride (DG), and triglyceride (TG), respectively. Then, each compositional ratio was calculated from a ratio of each peak area with respect to the total peak area. Results of Condition 1 are shown in Table 5 and FIG. 7, results of Condition 2 are shown in Table 6 and FIG. 8, results of Condition 3 are shown in Table 7 and FIG. 9, and results of Condition 4 are shown in Table 8 and FIG. 10, respectively.

TABLE 4

| | Introduction amount | | | Weight | | |
|---|---|---|---|---|---|---|
| | Waste clay | Ethanol | Sulfuric acid | Weight of solid portion | Weight of liquid portion | Total weight |
| Condition 1 | 75.0 | 75.2 | 1.5 | 47.96 | 28.47 | 76.43 |
| Condition 2 | 50.0 | 100.3 | 1.5 | 31.73 | 20.08 | 51.81 |
| Condition 3 | 30.0 | 120.1 | 1.5 | 19.05 | 13.42 | 32.47 |
| Condition 4 | 15.0 | 135.1 | 1.5 | 10.36 | 8.53 | 18.89 |

TABLE 5

| | Condition 1 | | | |
|---|---|---|---|---|
| | After one hour | After two hours | After three hours | After four hours |
| FAEE | 41.8 | 53.4 | 60.8 | 68.1 |
| FA | 0 | 0 | 0 | 0 |
| MG | 1.9 | 2.4 | 2.9 | 3.2 |
| DG | 13.4 | 14.9 | 14.2 | 12.7 |
| TG | 42.9 | 29.4 | 22.0 | 15.9 |
| Total | 100 | 100 | 100 | 100 |

TABLE 6

| | Condition 2 | | | |
|---|---|---|---|---|
| | After one hour | After two hours | After three hours | After four hours |
| FAEE | 47.5 | 60.3 | 66.4 | 73.9 |
| FA | 0 | 0 | 0 | 0 |
| MG | 2.3 | 3.4 | 3.9 | 4.0 |
| DG | 14.4 | 14.6 | 13.5 | 11.3 |
| TG | 35.8 | 21.6 | 16.2 | 10.8 |
| Total | 100 | 100 | 100 | 100 |

TABLE 7

| | Condition 3 | | | |
|---|---|---|---|---|
| | After one hour | After two hours | After three hours | After four hours |
| FAEE | 51.9 | 65.3 | 74.4 | 80.5 |
| FA | 0 | 0 | 0 | 0 |

TABLE 7-continued

| | Condition 3 | | | |
|---|---|---|---|---|
| | After one hour | After two hours | After three hours | After four hours |
| MG | 3.5 | 4.8 | 5.0 | 4.7 |
| DG | 14.2 | 12.9 | 10.2 | 8.0 |
| TG | 30.4 | 17.0 | 10.4 | 6.9 |
| Total | 100 | 100 | 100 | 100 |

TABLE 8

| | Condition 4 | | | |
|---|---|---|---|---|
| | After one hour | After two hours | After three hours | After four hours |
| FAEE | 67.1 | 79.0 | 85.0 | 90.1 |
| FA | 0 | 0 | 0 | 0 |
| MG | 5.3 | 4.8 | 4.0 | 3.0 |
| DG | 13.4 | 9.2 | 6.8 | 4.7 |
| TG | 14.2 | 7.0 | 4.2 | 2.3 |
| Total | 100 | 100 | 100 | 100 |

In the results of FIGS. 7 to 10, and Tables 5 to 8, the free fatty acid was not detected at all of Conditions 1 to 4. It was considered that methyl esterification occurred at substantially the total amount of the free fatty acid that was decomposed during the reaction.

In addition, at Conditions 1 to 3, a ratio of the triglyceride decreased with the passage of time, and the fatty acid ethyl ester (FAEE) increased in correspondence with the decrease. At Condition 4, all of the triglyceride (TG), the diglyceride (DG), and the monoglyceride (MG) were decomposed and decreased with the passage of time, and the fatty acid ethyl ester (FAEE) increased. It was recognized that as an introduction amount of ethanol becomes high, there was a tendency for the ratio of fatty acid ethyl ester that was obtained to increase.

Example 3

Examination was made with respect to a usage ratio of the lower alcohol with respect to the waste clay and a reaction time by using ethanol as the lower alcohol.

First, the stirrer (POWER STIRRER AMGH (trade name), manufactured by Asahi Rika Seisakusho Co., Ltd.), the thermometer holder, and the glass cover were provided to a four-mouth flask. Next, waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoloriztaion process) was homogenized using a mortar. A moisture content of the homogenized waste clay was 6.8%, and oily ingredients that were obtained by a Soxhlet extraction method (ether) was 28.3%.

Waste clay, ethanol (having purity of 99.5% or higher), and sulfuric acid in amounts shown in Table 9 were put into the flask. Then, a Dimorth cooler was connected to the flask, a temperature of an oil bath was set to 85° C., and stirring was performed. A point of time at which a reflux of ethanol was confirmed was set to a reaction initiation time. With regard to a stirring speed, gradations on POWER STIRRER (trade name: AMG-H, manufactured by Asahi Rika Seisakusho Co., Ltd.) were set to 2, and a reaction time was set to 8 hours. In addition, after two hours from the reaction initiation, samples for gas chromatography were collected every two hours a total of four times.

After the reaction was terminated, each of the samples was separated into a solid portion and a liquid portion using an eggplant-shaped flask and Buchner funnel whose tare was measured in advance. When performing the separation, the inside of the four-mouth flask and a perforated plate of the Buchner funnel were washed using methanol, and the washing continued until the liquid portion flowing out of the solid portion became transparent. Then, the funnel and the four-mouth flask were left as is for one hour in a thermostatic bath of 100° C. to evaporate the methanol, and a weight of the solid portion that remained was measured. In addition, a material, which was obtained by performing evaporation with respect to the egg-plant shaped flask to remove methanol, was set to the liquid portion, and the weight thereof was measured. Measurement results are shown in Table 9.

TABLE 9

| | Introduction amount | | | Weight of solid portion | Weight of liquid portion | Total weight |
|---|---|---|---|---|---|---|
| | Waste clay | Ethanol | Sulfuric acid | | | |
| Condition 1 | 75.02 | 75.04 | 1.5 | 49.35 | 28.97 | 78.32 |
| Condition 2 | 50.0 | 100.31 | 1.5 | 32.4 | 20.5 | 52.9 |

Figure 11:
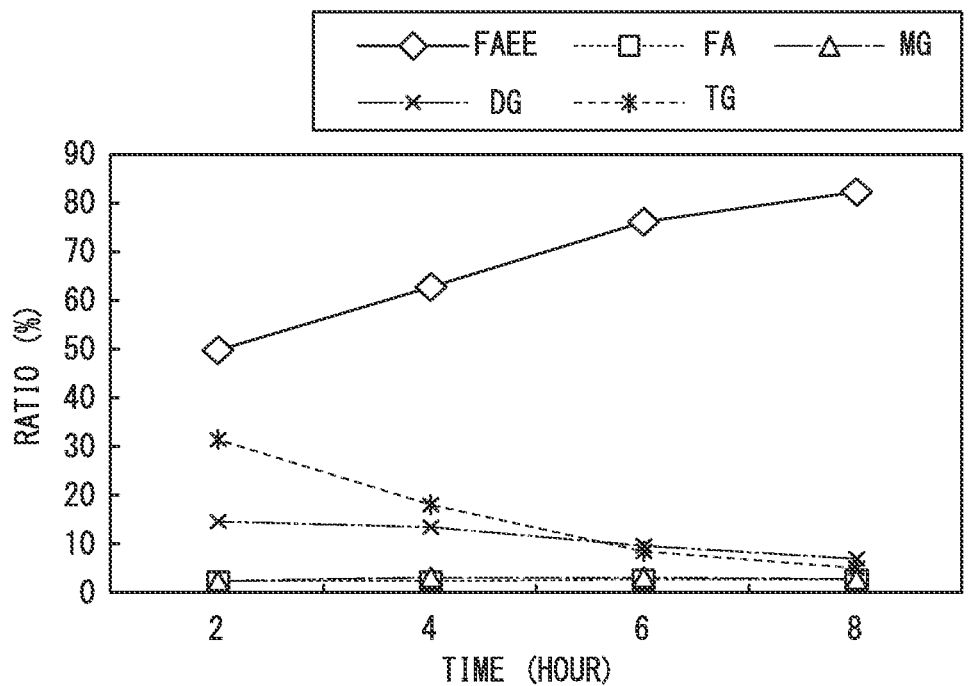
FIG. 11 is a graph illustrating a variation with the passage of time in a ratio of ester that may be obtained by a treatment of Condition 1 in Example 3, a free fatty acid, and fats and oils.
Figure 12:
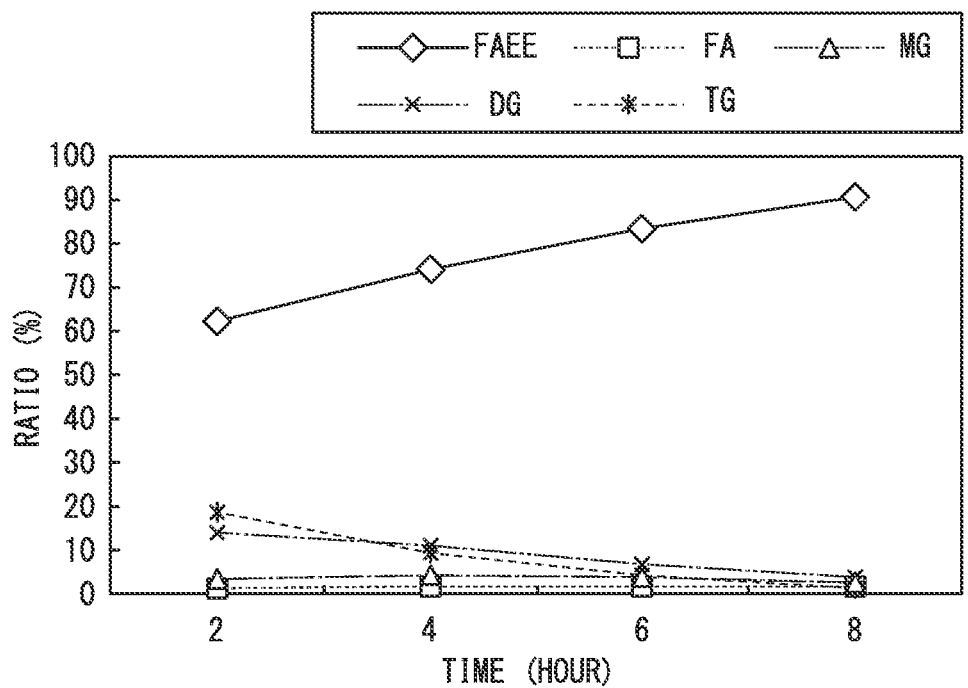
FIG. 12 is a graph illustrating a variation with the passage of time in a ratio of ester that may be obtained by a treatment of Condition 2 in Example 3, a free fatty acid, and fats and oils.
Figure 13:
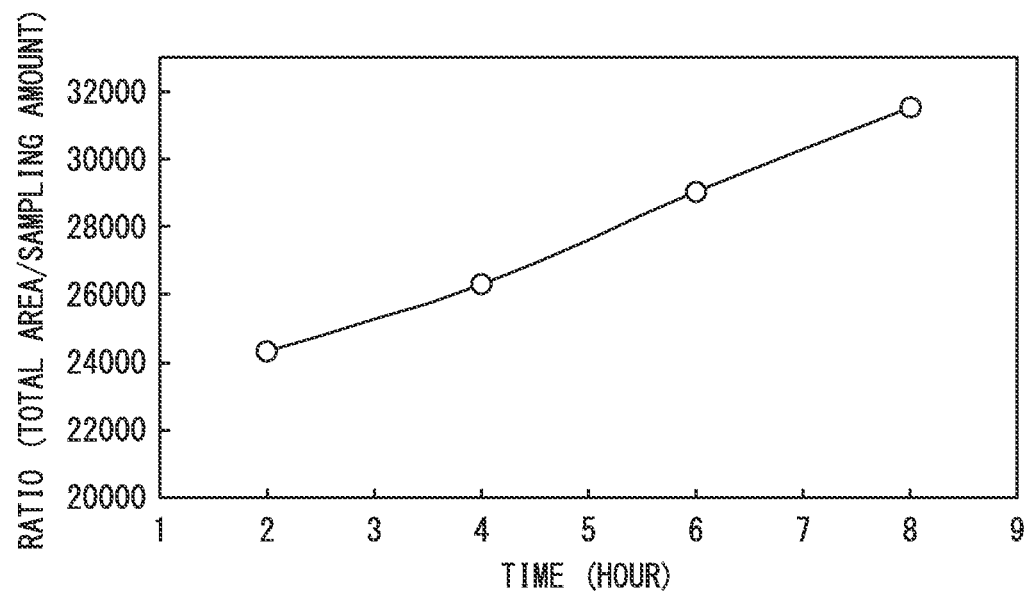
FIG. 13 is a graph illustrating a variation with the passage of time in an amount of fats and oils that are extracted by the treatment of Condition 1 in Example 3.
Figure 14:
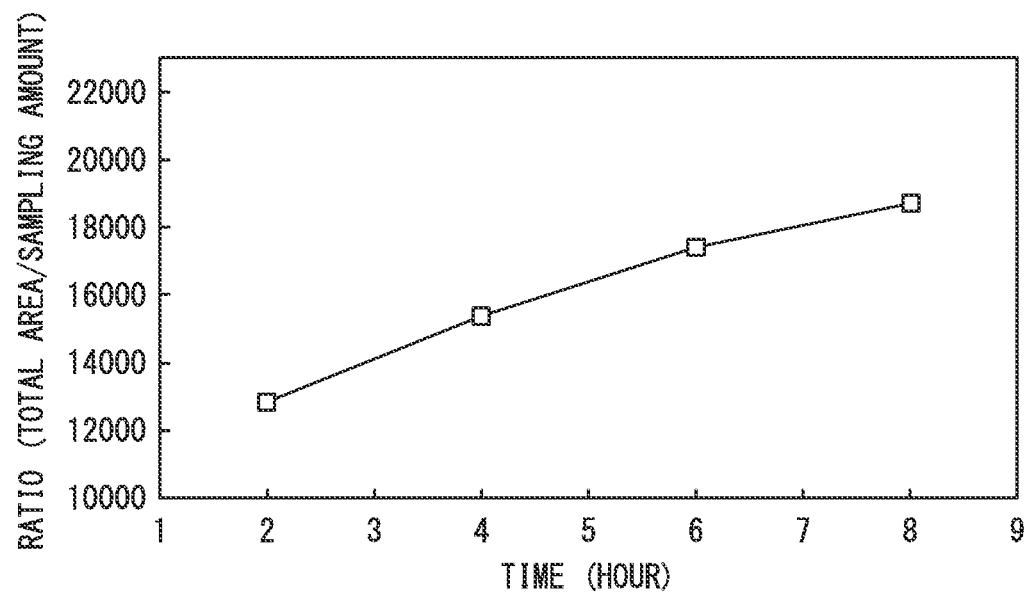
FIG. 14 is a graph illustrating a variation with the passage of time in an amount of fats and oils that are extracted by the treatment of Condition 2 in Example 3.

Peaks that were obtained by the gas chromatography were classified into fatty acid ethyl ester (FAEE), free fatty acid (FA), monoglyceride (MG), diglyceride (DG), and triglyceride (TG), respectively. Then, each compositional ratio was calculated from a ratio of each peak area with respect to the total peak area. In addition, the total area of the FA, FAEE, MG, DG, and TG, which was obtained from the gas chromatography chart, was divided by a sampling amount to calculate an extracted amount of the fats and oils. Results of Condition 1 are shown in FIGS. 11 and 13, and results of Condition 2 are shown in FIGS. 12 and 14.

As a result thereof, it could be confirmed that in any one of Conditions 1 and 2, TG was substantially decomposed at the eighth hour, and FAEE occupied the majority of the oily ingredients. In addition, it could be seen that the extracted amount of the fats and oils increased with the passage of time at both Conditions 1 and 2. Accordingly, it implied that there was a possibility of further increasing the extracted amount of the fats and oils by further increasing the time of the reflux reaction (i.e., esterification reaction).

Examination on the decolorization capacity of the regenerated clay was performed using the solid portion (i.e., the regenerated clay) that was obtained as described above.

Specifically, the stirring rod, the stirrer, and the thermometer holder were provided to a four-mouth flask, and 100 g of the deacidified soybean oil was put into the flask. The deacidified soybean oil was warmed to 100° C. by an oil bath while being stirred by the stirrer, and at a point of time at which a temperature of the deacidified soybean oil reached 100° C., 1 g (1%) of any one of the regenerated clays that were obtained by Conditions 1 and 2 and unused clay (GALLEON EARTH (trade name, manufactured by MIZUSAWA INDUSTRIAL CHEMICALS, LTD.) was put into the flask. Then, the resultant mixture was warmed to 105° C. After reaching 105° C., pressure reduction was performed for 30 minutes. After returning to a normal pressure after the passage of 30 minutes, the mixture was cooled with the air to 85° C. while being stirred, and filtration was performed to separate the clay. With regard to the fats and oils after the filtration, appearance observation and color measurement were performed in the same manner as Example 1.

According to the appearance observation, the regenerated clay, which was obtained by Condition 1, after the decolorization treatment, and the regenerated clay, which was obtained by Condition 2, after the decolorization treatment colored slightly red compared to the unused clay after the decolorization treatment, but it seemed as if all of these three samples were not much different. In addition, in this example, the reflux reaction (esterification reaction) time was extended from 4 hours to 8 hours differently from Example 2, but it did not seem as if the degree of regeneration was greatly improved.

Next, with regard to results of the L* value of CIElab, it could be confirmed that the L* value of the fats and oils (deacidified soybean oil) before the decolorization was 90.34, the L* value of the fats and oils after being decolorized with unused clay (GALLEON EARTH (trade name, manufactured by MIZUSAWA INDUSTRIAL CHEMICALS, LTD.) was 98.44, the L* value of the fats and oils after being decolorized with the regenerated clay of Condition 1 was 98.11, and the L* value of the fats and oils after being decolorized with the regenerated clay of Condition 2 was 98.06. From these results, it could be confirmed that in the case of using the regenerated clay of Condition 1 or 2, luminosity of the decolorized fats and oils that were obtained increased equivalently to the case of using the unused clay.

Example 4

Examination was made with respect to a usage ratio of the lower alcohol and the acid catalyst with respect to the waste clay by using ethanol as the lower alcohol.

The reaction was carried out while collecting samples for gas chromatography in the same manner as Condition 1 of Example 3 except that waste clay, ethanol (having purity of 99.5% or higher), and sulfuric acid in amounts shown in Table 10 were used, and weights of a solid portion and a liquid portion were measured.

TABLE 10

| | Introduction amount | | |
|---|---|---|---|
| | Waste clay | Ethanol | Sulfuric acid |
| Condition 1 | 75.02 | 75.08 | 7.53 |
| Condition 2 | 50.01 | 100.18 | 7.5 |

Figure 15:
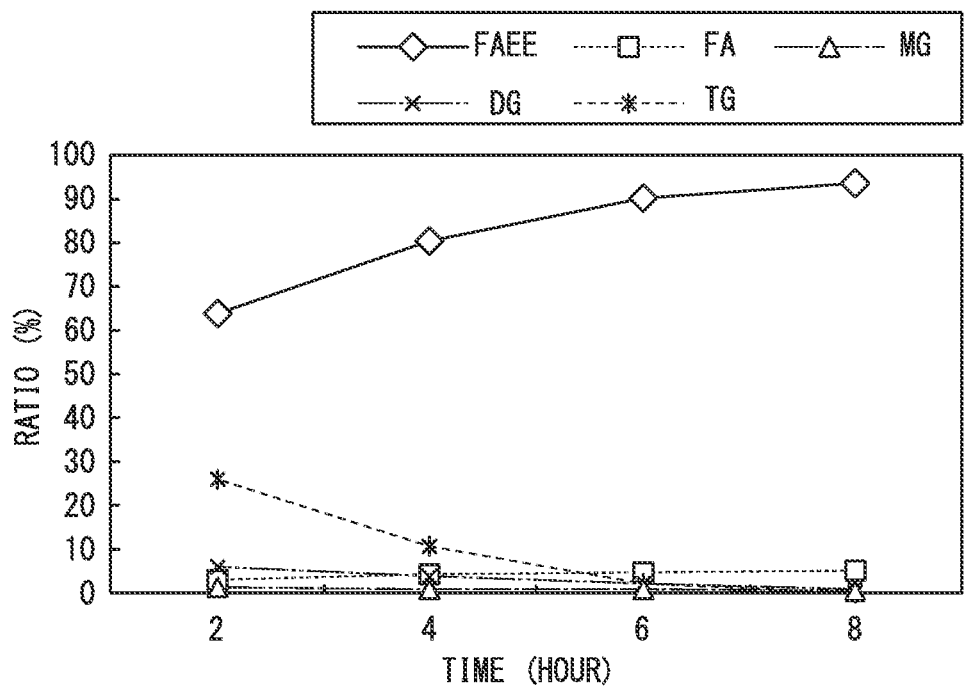
FIG. 15 is a graph illustrating a variation with the passage of time in a ratio of ester, a free fatty acid, and fats and oils that may be obtained by a treatment of Condition 1 in Example 4.
Figure 16:
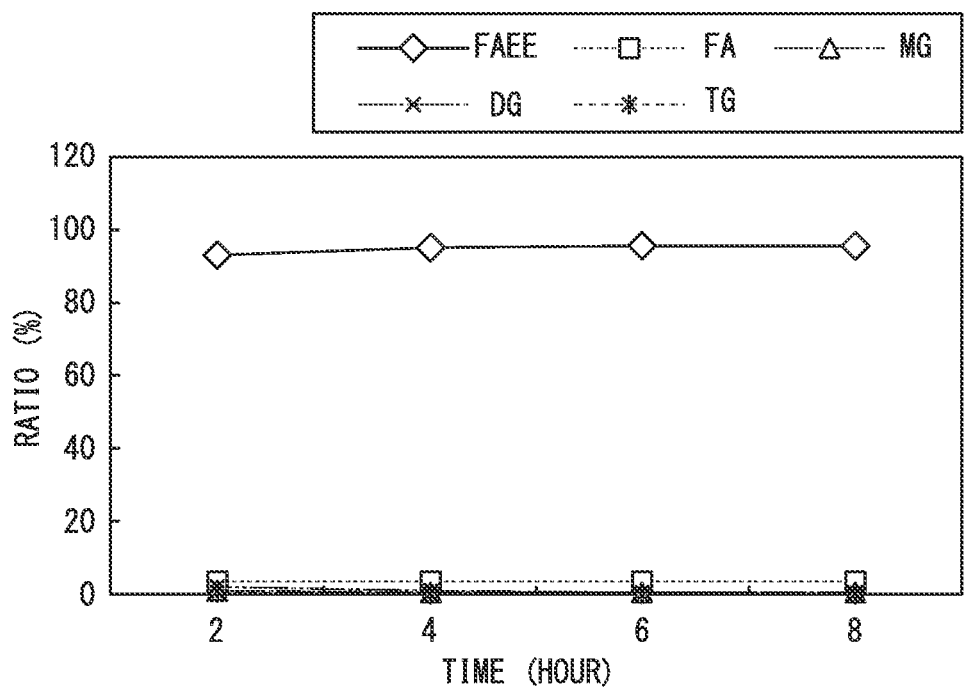
FIG. 16 is a graph illustrating a variation with the passage of time in a ratio of ester that may be obtained by a treatment of Condition 2 in Example 4, a free fatty acid, and fats and oils.
Figure 17:
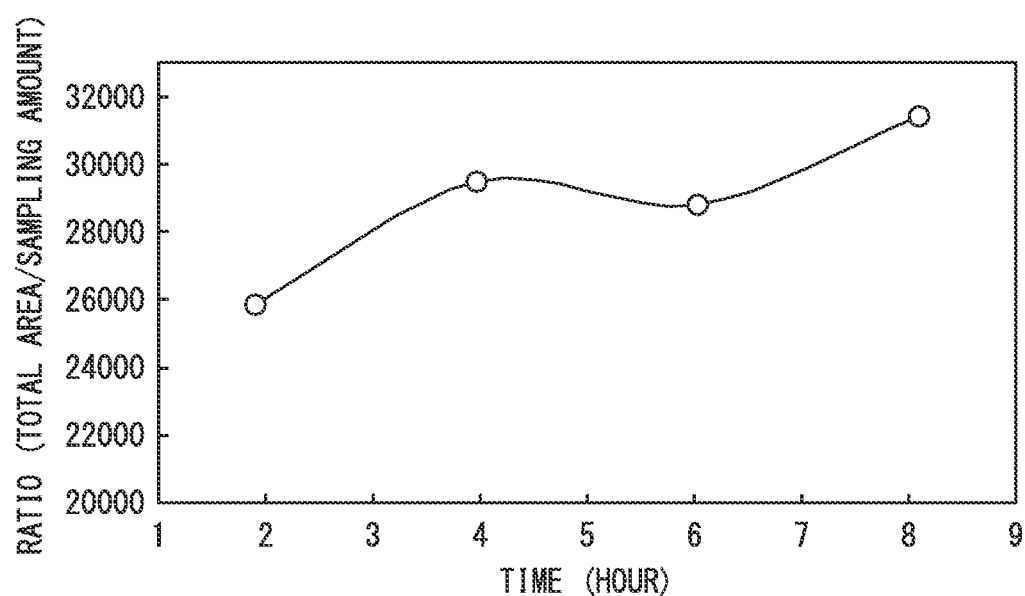
FIG. 17 is a graph illustrating a variation with the passage of time in an amount of fats and oils that are extracted by the treatment of Condition 1 in Example 4.
Figure 18:
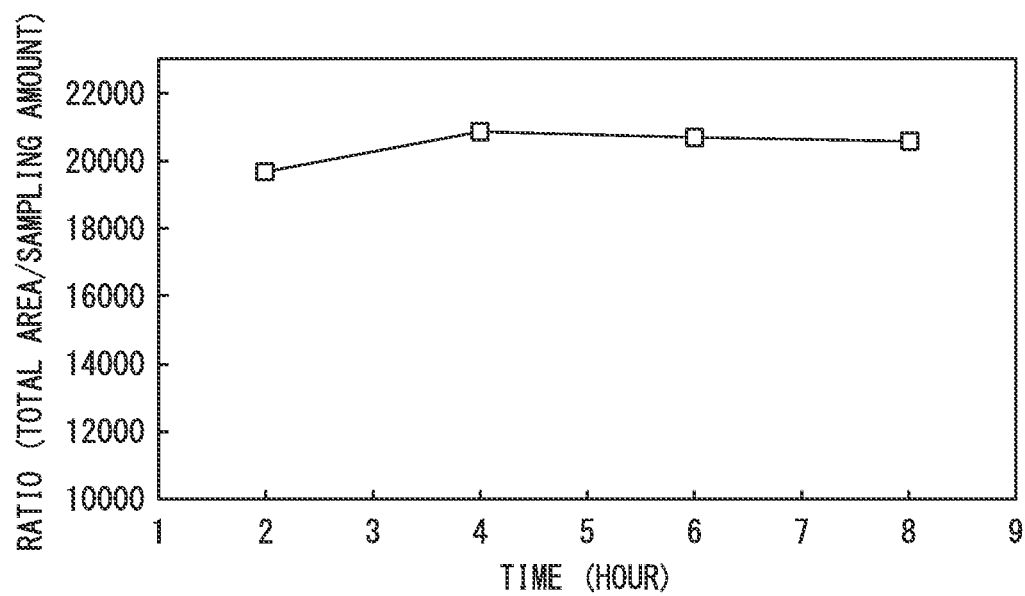
FIG. 18 is a graph illustrating a variation with the passage of time in an amount of fats and oils that are extracted by the treatment of Condition 2 in Example 4.

Peaks that were obtained by the gas chromatography were classified into fatty acid ethyl ester (FAEE), free fatty acid (FA), monoglyceride (MG), diglyceride (DG), and triglyceride (TG), respectively. Then, each compositional ratio was calculated from a ratio of each peak area with respect to the total peak area. Furthermore, the total area of FA, FAEE, MG, DG, and TG that were obtained from the gas chromatography chart was divided by a sampling amount to calculate an extracted amount of the fats and oils. Results of Condition 1 are shown in FIGS. 15 and 17 and results of Condition 2 are shown in FIGS. 16 and 18, respectively.

As a result thereof, at Condition 1, a ratio of FAEE increased and ratios of TG, DG, and MG decreases dependently on the reflux reaction (esterification reaction) time. In addition, at Condition 2, although each composition was approximately steady from the second hour after the reaction initiation, a slight decrease in DG was shown.

In addition, with regard to the extracted amount of the fats and oils, at Condition 1, a shape of a curve indicating a time variation was slightly distorted, an increasing tendency was seen. In addition, at Condition 2, the extracted amount of the fats and oils was approximately steady after two hours in the reflux reaction. From these results, at Condition 1, it implied that with regard to the reflux reaction time, even when 8 hours has passed, the extraction of the fats and oils continued, and at Condition 2, the extraction of the fats and oils was terminated approximately after 4 hours from the reaction initiation.

Examination on the Decolorization capacity of the regenerated clay was performed using the solid portion (i.e., regenerated clay) that was obtained as described in the same manner as Example 3.

From the results, the decolorization capacity of the regenerated clay that was obtained by Condition 1 was slightly improved compared to the regenerated clay that was obtained by Condition 1 in Example 3, but was inferior to the unused clay. On the other hand, from appearance observation, it could be confirmed that the decolorization capacity of the regenerated clay that was obtained by Condition 2 had approximately the same decolorization capacity as the unused clay.

Next, with regard to results of the L* value of CIElab, it could be confirmed that the L* value of the fats and oils (i.e., deacidified soybean oil) before the decolorization was 90.34, the L* value of the fats and oils after being decolorized with unused clay was 99.05, the L* value of the fats and oils after being decolorized with the regenerated clay of Condition 1 was 98.67, and the L* value of the fats and oils after being decolorized with the regenerated clay of Condition 2 was 99.28. From these results, it could be confirmed that in the case of using the regenerated clay of Condition 1 or 2, luminosity of the decolorized fats and oils that were obtained increased equivalently to the case of using the unused clay.

Example 5

Examination was made with respect to how the decolorization capacity of the obtained regenerated clay varied according to a difference between treatment conditions of the waste clay.

<<Condition 1>>

A stirrer (Migthy MAGshiel MG-4 type (trade name), manufactured by NAKAMURA SCIENTIFIC INSTRUMENTS INDUSTRY CO., LTD.), a thermometer holder, and a glass cover were provided to a four-mouth flask. Next, 50 g of waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoloriztaion process), 100 g of 95% ethanol, and 4.5 g of a sulfuric acid were put into the flask.

A Dimorth cooler was connected to the flask, a temperature of an oil bath was set to 85° C., and stirring was performed. A point of time at which the reflux of the ethanol was confirmed was set to the reaction initiation time. The stirring speed was set to 300 rpm by THREE-ONE MOTOR FBL 3000 (trade name, manufactured by SHINTO Scientific Co., Ltd), and the reaction time was set to five hours.

After the reaction was terminated, separation into a solid portion and a liquid portion was performed using a Buchner funnel. When performing the separation, the inside of the four-mouth flask and a perforated plate of the Buchner funnel were washed using ethanol (approximately 70 ml). Then, the funnel was left as is for four hours in the thermostatic bath of 110° C. to evaporate the ethanol, and the solid portion that was obtained was collected.

<<Condition 2>>

The stirrer (Mighty MAGshiel MG-4 type (trade name), manufactured by NAKAMURA SCIENTIFIC INSTRUMENTS INDUSTRY CO., LTD.), the thermometer holder, and the glass cover were provided to a four-mouth flask. Next, 25 g of waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoloriztaion process), 125 g of 99.5% ethanol, and 4.5 g of a sulfuric acid were put into the flask.

The Dimorth cooler was connected to the flask, the temperature of the oil bath was set to 85° C., and stirring was performed. A point of time at which the reflux of the ethanol was confirmed was set to the reaction initiation time. The stirring speed was set to 300 rpm by THREE-ONE MOTOR FBL 3000 (trade name, manufactured by SHINTO Scientific Co., Ltd), and a reaction time was set to four hours.

After the reaction was terminated, separation into a solid portion and a liquid portion was performed using the Buchner funnel. Then, the funnel was left as is for four hours in the thermostatic bath of 110° C. to evaporate the ethanol, and the solid portion that was obtained was collected.

<<Condition 3>>

The stirrer (Migthy MAGshiel MG-4 type (trade name), manufactured by NAKAMURA SCIENTIFIC INSTRUMENTS INDUSTRY CO., LTD.), the thermometer holder, and the glass cover were provided to a four-mouth flask. Next, 15 g of waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoloriztaion process), 135 g of 95% ethanol, and 4.5 g of a sulfuric acid were put into the flask.

The Dimorth cooler was connected to the flask, the temperature of the oil bath was set to 85° C., and stirring was performed. A point of time at which the reflux of the ethanol was confirmed was set to the reaction initiation time. The stirring speed was set to 300 rpm by THREE-ONE MOTOR FBL 3000 (trade name, manufactured by SHINTO Scientific Co., Ltd), and the reaction time was set to one hour.

After the reaction was terminated, separation into a solid portion and a liquid portion was performed using the Buchner funnel. When performing the separation, the inside of the four-mouth flask and a perforated plate of the Buchner funnel were washed using ethanol (approximately 30 ml), and the washing continued until the liquid portion flowing out of the solid portion became transparent. Then, the funnel was left as is for four hours in the thermostatic bath of 110° C. to evaporate the ethanol, and the solid portion that was obtained was collected.

<<Condition 4>>

The stirrer (Migthy MAGshiel MG-4 type (trade name), manufactured by NAKAMURA SCIENTIFIC INSTRUMENTS INDUSTRY CO., LTD.), the thermometer holder, and the glass cover were provided to a four-mouth flask. Next, 25 g of waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoloriztaion process), 125 g of 95% ethanol, and 0.15 g of a sulfuric acid were put into the flask.

The Dimorth cooler was connected to the flask, the temperature of the oil bath was set to 85° C., and stirring was performed. A point of time at which the reflux of the ethanol was confirmed was set to the reaction initiation time. The stirring speed was set to 300 rpm by THREE-ONE MOTOR FBL 3000 (trade name, manufactured by SHINTO Scientific Co., Ltd), and the reaction time was set to five hours.

After the reaction was terminated, separation into a solid portion and a liquid portion was performed using the Buchner funnel. When performing the separation, the inside of the four-mouth flask and a perforated plate of the Buchner funnel were washed using ethanol (approximately 30 ml). Then, the funnel was left as is for four hours in the thermostatic bath of 110° C. to evaporate the ethanol, and the solid portion that was obtained was collected.

<<Condition 5>>

The stirrer (Migthy MAGshiel MG-4 type (trade name), manufactured by NAKAMURA SCIENTIFIC INSTRUMENTS INDUSTRY CO., LTD.), the thermometer holder, and the glass cover were provided to a four-mouth flask. Next, 25 g of waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoloriztaion process), 125 g of 50% ethanol, and 4.5 g of a sulfuric acid were put into the flask.

The Dimorth cooler was connected to the flask, the temperature of the oil bath was set to 85° C., and stirring was performed. A point of time at which the reflux of the ethanol was confirmed was set to the reaction initiation time. The stirring speed was set to 300 rpm by THREE-ONE MOTOR FBL 3000 (trade name, manufactured by SHINTO Scientific Co., Ltd), and the reaction time was set to five hours.

After the reaction was terminated, separation into a solid portion and a liquid portion was performed using the Buchner funnel. When performing the separation, the inside of the four-mouth flask and a perforated plate of the Buchner funnel were washed using ethanol (approximately 50 ml). Then, the funnel was left as is for four hours in the thermostatic bath of 110° C. to evaporate the ethanol, and the solid portion that was obtained was collected.

<<Condition 6>>

The stirrer (Migthy MAGshiel MG-4 type (trade name), manufactured by NAKAMURA SCIENTIFIC INSTRUMENTS INDUSTRY CO., LTD.), the thermometer holder, and the glass cover were provided to a four-mouth flask. Next, 50 g of waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoloriztaion process), 100 g of 95% ethanol, and 12.0 g of a p-toluene sulfonic acid (PTS) were put into the flask.

The Dimorth cooler was connected to the flask, the temperature of the oil bath was set to 85° C., and stirring was performed. A point of time at which the reflux of the ethanol was confirmed was set to the reaction initiation time. The stirring speed was set to 300 rpm by THREE-ONE MOTOR FBL 3000 (trade name, manufactured by SHINTO Scientific Co., Ltd), and the reaction time was set to five hours.

After the reaction was terminated, separation into a solid portion and a liquid portion was performed using the Buchner funnel. When performing the separation, the inside of the four-mouth flask and a perforated plate of the Buchner funnel were washed using ethanol (approximately 70 ml). Then, the funnel was left as is for four hours in the thermostatic bath of 110° C. to evaporate the ethanol, and the solid portion that was obtained was collected.

<<Condition 7>>

The stirrer (Migthy MAGshiel MG-4 type (trade name), manufactured by NAKAMURA SCIENTIFIC INSTRUMENTS INDUSTRY CO., LTD.), the thermometer holder, and the glass cover were provided to a four-mouth flask. Next, 50 g of waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoloriztaion process), 100 g of 95% ethanol, and 4.5 g of a sulfuric acid were put into the flask.

The Dimorth cooler was connected to the flask, the temperature of the oil bath was set to 85° C., and stirring was performed. A point of time at which the reflux of the ethanol was confirmed was set to the reaction initiation time. The stirring speed was set to 300 rpm by THREE-ONE MOTOR FBL 3000 (trade name, manufactured by SHINTO Scientific Co., Ltd), and the reaction time was set to five hours.

After the reaction was terminated, separation into a solid portion and a liquid portion was performed using the Buchner funnel. When performing the separation, the inside of the four-mouth flask and a perforated plate of the Buchner funnel were washed using ethanol (approximately 70 ml). Then, the funnel was left as is for four hours in the thermostatic bath of 110° C. to evaporate the ethanol, and the solid portion that was obtained was collected.

<<Comparative Condition 1>>

The stirrer, the thermometer holder, and the glass cover were provided to a four-mouth flask. Next, 50 g of waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoloriztaion process), and 100 g of hexane were put into the flask.

The Dimorth cooler was connected to the flask, the temperature of the oil bath was set to 85° C., and stirring was performed. A point of time at which the reflux of the hexane was confirmed was set to the reaction initiation time. The stirring speed was set to 300 rpm by THREE-ONE MOTOR FBL 3000 (trade name, manufactured by SHINTO Scientific Co., Ltd), and the reaction time was set to five hours.

After the reaction was terminated, separation into a solid portion and a liquid portion was performed using the Buchner funnel. When performing the separation, the inside of the four-mouth flask and a perforated plate of the Buchner funnel were washed using hexane (approximately 100 ml). Then, the funnel was left as is for four hours in the thermostatic bath of 110° C. to evaporate the hexane, and the solid portion that was obtained was collected.

<<Comparative Condition 2>>

The stirrer, the thermometer holder, and the glass cover were provided to a four-mouth flask. Next, 50 g of waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoloriztaion process), 100 g of hexane, and 4.5 g of sulfuric acid were put into the flask.

The Dimorth cooler was connected to the flask, the temperature of the oil bath was set to 85° C., and stirring was performed. A point of time at which the reflux of the hexane was confirmed was set to the reaction initiation time. The stirring speed was set to 300 rpm by THREE-ONE MOTOR FBL 3000 (trade name, manufactured by SHINTO Scientific Co., Ltd), and the reaction time was set to five hours.

After the reaction was terminated, separation into a solid portion and a liquid portion was performed using the Buchner funnel. When performing the separation, the inside of the four-mouth flask and a perforated plate of the Buchner funnel were washed using hexane (approximately 100 ml). Then, the funnel was left as is for four hours in the thermostatic bath of 110° C. to evaporate the hexane, and the solid portion that was obtained was collected.

(Confirmation of Decolorization Capacity of Regenerated Clay)

Examination on the decolorization capacity of the regenerated clay was performed using the solid portion (i.e., the regenerated clay) that was obtained as described above.

Specifically, the stirring rod, the stirrer, and the thermometer holder were provided to a four-mouth flask, and 100 g of the deacidified soybean oil was put into the flask. 1 g of any one of the regenerated clays that were obtained by Conditions 1 to 7, and Comparative Condition 1 was put into the flask, and the decolorization reaction was performed at 105° C. for 0.5 hours under reduced pressure while performing stirring using the stirrer.

Then, fats and oils were extracted by filtration, and the L* value of the fats and oils, which were obtained, was measured by spectroscopic colorimeter SD5000 (trade name, manufactured by Nippon Denshoku Co., LTD.; a glass cell; and a length of an optical path: 10 mm).

Similarly, with regard to chromaticity of the fats and oils that were obtained, the Y value was measured with LOVI-BOND TINTOMETER MODEL E (trade name, manufactured by THE TINTOMETER LTD.; glass cell; a length of an optical path: 5.25 inches).

Chromaticity measurement results of decolorized oil that was decolorized with the regenerated clay obtained under the reaction conditions of each esterification reaction, and chromaticity measurement results of the deacidified soybean oil that was not subjected to the decolorization process are shown in Table 11. In addition, in L* values in the table, "77+" represents a hue equal to or higher than a measurement threshold value (77) of a measuring apparatus that was used.

TABLE 11

|  | Introduction amount | | | | Measurement results | |
| --- | --- | --- | --- | --- | --- | --- |
|  | Waste clay | Ethanol | Sulfuric acid | Reaction time | L* | Y |
| Condition 1 | 50.0 | 95% 100.0 | 4.5 | 5 | 98.80 | 12 |
| Condition 2 | 25.0 | 99.5% 125.0 | 4.5 | 4 | 97.44 | 31 |
| Condition 3 | 15.0 | 95% 135.0 | 4.5 | 1 | 98.52 | 17 |
| Condition 4 | 25.0 | 95% 125.0 | 0.15 | 5 | 97.49 | 30 |
| Condition 5 | 25.0 | 50% 125.0 | 4.5 | 7 | 96.80 | 33 |
| Condition 6 | 50.0 | 95% 100.0 | PTS 12.0 | 5 | 98.50 | 17 |
| Condition 7 | 50.0 | 95% 100.0 | 4.5 | 5 | 98.21 | 19 |
| Comparative Condition 1 | 50.0 | Hexane 100.0 | — | 5 | 91.05 | 62 |
| Comparative Condition 2 | 50.0 | Hexane 100.0 | 4.5 | 5 | 90.46 | 77+ |
| Unused clay | — | — | — | — | 98.77 | 12 |
| Non-treated waste clay | — | — | — | — | 94.50 | 55 |
| Deacidified oil before decolorization | — | — | — | 5 | 88.65 | 77 |

It was confirmed that in the deacidified oil decolorized with the regenerated clay that was treated by any one of Conditions 1 to 7, the L* value was higher and the Y value was lower than those of the deacidified oil decolorized with non-treated waste clay. On the other hand, it was confirmed that in the deacidified oil decolorized with the waste clay (Comparative Condition 1) from which oily ingredients were extracted by the hexane in a state in which the sulfuric acid was not present, the L* value was higher and the Y value was lower than those of the deacidified oil before the decolorization, but the L* value was lower and the Y value was higher than those of the oil decolorized with the non-treated waste clay. In the deacidified oil decolorized with the waste clay (Comparative Condition 2) from which oily ingredients were extracted by the hexane in a state in which the sulfuric acid was present, the L* value was higher than that of the deacidified oil before the decolorization, but conversely, the Y value increased, and thus it could be seen that the decolorization capacity of the waste clay could be hardly regenerated at Comparative Condition 2.

Example 6

Examination was made with respect to a compositional variation of the fats and oil, an effect on washing, and the decolorization capacity of the obtained regenerated clay according to the purity of the ethanol with respect to the waste clay and the reaction time.

The reaction was carried out while collecting samples for gas chromatography in the same manner as Condition 1 of Example 5 except that the waste clay, the ethanol, and the sulfuric acid in amounts shown in Table 12 were used, and the reaction was carried out for a reaction time of the reflux reaction (i.e., esterification reaction), and weights of a solid portion and a liquid portion were measured.

TABLE 12

|  | Introduction amount | | | | Measurement results | |
| --- | --- | --- | --- | --- | --- | --- |
|  | Waste clay | Ethanol | Sulfuric acid | Reaction time | L* | Y |
| Condition 1 | 50.0 | 99.5% 100.0 | 4.5 | 4 | 98.72 | 12 |
| Condition 2 | 50.0 | 95% 100.0 | 4.5 | 4 | 98.47 | 14 |
| Condition 3 | 50.0 | 95% 100.0 | 4.5 | 5 | 98.73 | 12 |
| Condition 4 | 50.0 | 95% 100.0 | 3.0 | 6 | 98.47 | 14 |
| Condition 5 | 50.0 | 95% 100.0 | 7.5 | 4 | 98.72 | 12 |
| Unused clay | — | — | — | — | 98.77 | 12 |
| Non-treated waste clay | — | — | — | — | 94.50 | 55 |
| Deacidified oil before decolorization | — | — | — | — | 88.65 | 77 |

Peaks that were obtained by the gas chromatography were classified into fatty acid ethyl ester (FAEE), free fatty acid (FA), monoglyceride (MG), diglyceride (DG), and triglyceride (TG), respectively. Then, each compositional ratio was calculated from a ratio of each peak area with respect to the total peak area. Calculation results are shown in Tables 13 to 17.

TABLE 13

| | Condition 1 | | | |
|---|---|---|---|---|
| | After one hour | After two hours | After three hours | After four hours |
| FAEE | 75.8 | 91.0 | 96.0 | 96.8 |
| FA | 1.5 | 1.5 | 1.4 | 1.4 |
| MG | 4.1 | 2.3 | 1.1 | 0.7 |
| DG | 9.1 | 3.4 | 1.3 | 1.1 |
| TG | 9.5 | 1.9 | 0.3 | 0.0 |
| Total | 100 | 100 | 100 | 100 |

TABLE 14

| | Condition 2 | | | |
|---|---|---|---|---|
| | After one hour | After two hours | After three hours | After four hours |
| FAEE | 66.0 | 82.4 | 90.0 | 92.6 |
| FA | 3.6 | 3.9 | 3.9 | 3.9 |
| MG | 5.4 | 4.5 | 2.6 | 1.6 |
| DG | 11.3 | 5.5 | 2.7 | 1.6 |
| TG | 13.7 | 3.8 | 0.8 | 0.2 |
| Total | 100 | 100 | 100 | 100 |

TABLE 15

| | Condition 3 | | | | |
|---|---|---|---|---|---|
| | After one hour | After two hours | After three hours | After four hours | After five hours |
| FAEE | 55.6 | 79.0 | 88.7 | 92.2 | 94.1 |
| FA | 3.1 | 3.7 | 3.8 | 3.8 | 3.8 |
| MG | 2.3 | 2.4 | 1.5 | 0.9 | 0.5 |
| DG | 14.5 | 8.6 | 4.2 | 2.6 | 1.6 |
| TG | 24.5 | 6.2 | 1.8 | 0.5 | 0 |
| Total | 100 | 100 | 100 | 100 | 100 |

TABLE 16

| | Condition 4 | | | | | |
|---|---|---|---|---|---|---|
| | After one hour | After two hours | After three hours | After four hours | After five hours | After six hours |
| FAEE | 35.7 | 54.2 | 70.8 | 79.2 | 85.7 | 89.6 |
| FA | 2.3 | 3.2 | 3.8 | 3.9 | 4.0 | 4.0 |
| MG | 3.7 | 5.4 | 5.5 | 4.7 | 3.5 | 2.5 |
| DG | 15.6 | 14.9 | 10.0 | 6.7 | 4.2 | 2.6 |
| TG | 42.7 | 22.4 | 10.0 | 5.5 | 2.6 | 1.3 |
| Total | 100 | 100 | 100 | 100 | 100 | 100 |

TABLE 17

| | Condition 5 | | | |
|---|---|---|---|---|
| | After one hour | After two hours | After three hours | After four hours |
| FAEE | 63.2 | 86.3 | 93.2 | 94.3 |
| FA | 3.1 | 3.9 | 4.0 | 3.9 |
| MG | 3.9 | 2.5 | 0.9 | 0.6 |
| DG | 9.0 | 3.9 | 1.7 | 1.2 |
| TG | 20.8 | 2.8 | 0.2 | 0.0 |
| Total | 100 | 100 | 100 | 100 |

At all of Conditions 1 to 5, the ratio of the fatty acid ethyl ester (FAEE) increased in combination with an increase of the reaction time. In addition, from the results of Conditions 2 to 5, it could be confirmed that when other conditions were the same, there was a tendency for the fatty acid ethyl ester to be quickly generated as a mixing ratio of the acidic catalyst increases, but with regard to the ratio of the free fatty acid (FA), when the purity of the ethanol is the same, there was no large difference.

(Confirmation of Decolorization Capacity of Regenerated Clay)

Examination on the decolorization capacity of the regenerated clay was performed using the solid portion (i.e., the regenerated clay) that was obtained as described above in the same manner as Example 5. Chromaticity measurement results of the decolorized oil that was decolorized with the regenerated clay obtained under reaction conditions of each esterification reaction, and chromaticity measurement results of the deacidified soybean oil that was not subjected to the decolorization process are shown in Table 12. The acidified oil decolorized with the regenerated clay that was treated under each of Conditions 1 to 5, all L* values and Y values had substantially the same values as those of the deacidified oil that was decolorized with unused clay.

Example 7

Examination was made on an effect that was caused by further washing the regenerated clay after the esterification reaction with water.

The stirrer (Mighty MAGshiel MG-4 type (trade name), manufactured by NAKAMURA SCIENTIFIC INSTRUMENTS INDUSTRY CO., LTD.), the thermometer holder, and the glass cover were provided to a four-mouth flask. Next, 50 g of waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoloriztaion process), 100 g of 95% ethanol, and 4.5 g of a sulfuric acid were put into the flask.

The Dimorth cooler was connected to the flask, the temperature of the oil bath was set to 85° C., and stirring was performed. A point of time at which the reflux of the ethanol was confirmed was set to the reaction initiation time. The stirring speed was set to 300 rpm by THREE-ONE MOTOR FBL 3000 (trade name, manufactured by SHINTO Scientific Co., Ltd), the sample for the gas chromatography was collected every one hour after the reaction initiation, and the reaction time was set to five hours.

After the reaction was terminated, separation into a solid portion and a liquid portion was performed using the Buchner funnel. When performing the separation, the inside of the four-mouth flask and a perforated plate of the Buchner funnel were washed using ethanol (approximately 70 ml).

Then, the solid portion was scrapped into a stainless stein of 500 ml, water (100 g) was added to the solid portion, and stirring and washing was performed for 10 minutes. The water washing operation was performed once, but for comparison, the water washing operation was further performed two times and three times, respectively.

After the stirring and washing, a solid portion and a liquid portion are separated using the Buchner funnel, the funnel was left as is for eight hours in a thermostatic bath of 110° C. to evaporate the liquid portion containing water as a main component, and the solid portion that was obtained was collected.

Examination on the decolorization capacity of the regenerated clay was performed using the solid portion (i.e., the regenerated clay) that was obtained as described above in the same manner as Example 5. The reaction conditions, chromaticity measurement results of the decolorized oil that was decolorized with the obtained regenerated clay, and chromaticity measurement results of the deacidified soybean oil that was not subjected to the decolorization process are shown in Table 18. Even when the water washing operation was performed, it was confirmed that the decolorization capacity did not significantly decrease.

TABLE 18

| | Introduction amount | | | Measurement results | |
|---|---|---|---|---|---|
| | Waste clay | Ethanol | Sulfuric acid | Reaction time | $L^*$ | Y |
| Water washing: One time | 50.0 | 95% 100.0 | 4.5 | 5 | 98.73 | 12 |
| Water washing: Two times | 50.0 | 95% 100.0 | 4.5 | 5 | 98.74 | 12 |
| Water washing: Three times | 50.0 | 95% 100.0 | 4.5 | 5 | 98.72 | 12 |
| Unused clay | — | — | — | — | 98.77 | 12 |
| Non-treated waste clay | — | — | — | — | 94.50 | 55 |
| Deacidified oil before decolorization | — | — | — | — | 88..65 | 77 |

Example 8

Examination was made with respect to an effect that was caused by not performing a neutralization treatment before washing the regenerated clay obtained after the esterification reaction.

The stirrer (Mighty MAGshiel MG-4 type (trade name), manufactured by NAKAMURA SCIENTIFIC INSTRUMENTS INDUSTRY CO., LTD.), the thermometer holder, and the glass cover were provided to a four-mouth flask. Next, 125 g of waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoloriztaion process), 250 g of 95% ethanol, and 11.25 g (3% on the basis of the entire reaction solution) of a sulfuric acid were put into the flask.

The Dimorth cooler was connected to the flask, the temperature of the oil bath was set to 85° C., and stirring was performed. A point of time at which the reflux of the ethanol was confirmed was set to the reaction initiation time. The stirring speed was set to 300 rpm by THREE-ONE MOTOR FBL 3000 (trade name, manufactured by SHINTO Scientific Co., Ltd), the sample for the gas chromatography was collected every one hour after the reaction initiation, and the reaction time was set to four hours.

After the reaction was terminated, sodium hydroxide or sodium carbonate was added to the reaction solution in such a manner that an addition amount of the alkali with respect to the entirety of reaction solution became an amount (mol %) shown in Table 19, and the resultant material was mixed. Then, a solid portion and a liquid portion were separated by a Buchner funnel. When performing the separation, the inside of the four-mouth flask and a perforated plate of the Buchner funnel were washed using ethanol (approximately 70 ml).

95% ethanol was added to the solid portion that was obtained and washing was performed. An amount of ethanol that was necessary for the washing was 400 ml in the case of the neutralization with the sodium hydroxide, and was 700 ml in the case of the neutralization with the sodium carbonate. A brown drop, which was insoluble in ethanol, adhered to a filtrate.

The solid portion after the ethanol washing was scrapped into a stainless stein of 500 ml, water (100 g) was added to the solid portion, and stirring and washing was performed one time for 10 minutes, or was repeated two times. After the stirring and washing, a solid portion and a liquid portion are separated using the Buchner funnel, the funnel was left as is for eight hours in a thermostatic bath of 110° C. to evaporate the liquid portion containing water as a main component, and the solid portion that was obtained was collected.

TABLE 19

| | Addition amount of alkali (mol %) | | | | | |
|---|---|---|---|---|---|---|
| | NaOH 65% | $Na_2Co_3$ 65% | NaOH 70% | $Na_2Co_3$ 70% | $Na_2Co_3$ 75% | $Na_2Co_3$ 100% |
| | Water washing: one time | | | | | |
| pH | 3.9 | 4.0 | 4.7 | 5.7 | 7.7 | 8.9 |
| Y value | 27 | 25 | 32 | 42 | 55 | 79 |
| | Water washing: two times | | | | | |
| pH | 4.1 | 4.2 | 4.8 | 5.4 | | |
| Y value | 22 | 18 | 24 | 27 | | |

The pH of the washing solution, and the Y value of the solid portion (regenerated clay) that was obtained after the washing were measured. Measurement results are shown in Table 19. From the results, it could be seen that the pH of the waste liquid to be discharged could be made relatively high due to the addition of the alkali into the reaction solution, which was obtained by the esterification reaction, before the solid-liquid separation, and particularly, when the waste water was made to have pH of 4 to 5 by the neutralization treatment, satisfactory regenerated clay in which the Y value was small could be obtained.

Example 9

Examination was made with respect to a variation in the decolorization capacity due to continuous regeneration.
<<Condition 1>>

The stirrer (Mighty MAGshiel MG-4 type (trade name), manufactured by NAKAMURA SCIENTIFIC INSTRUMENTS INDUSTRY CO., LTD.), the thermometer holder, and the glass cover were provided to a four-mouth flask. Next, 100 g of waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoriztaion process), 200 g of 95% ethanol, and 3 g of a sulfuric acid were put into the flask.

The Dimorth cooler was connected to the flask, the temperature of the oil bath was set to 80° C., and stirring was performed. A point of time at which the reflux of the ethanol was confirmed was set to the reaction initiation time. The stirring speed was set to 300 rpm by THREE-ONE MOTOR FBL 3000 (trade name, manufactured by SHINTO Scientific Co., Ltd), and the reaction time was set to five hours.

After the reaction was terminated, a solid portion and a liquid portion were separated by a Buchner funnel. When performing the separation, the inside of the four-mouth flask and a perforated plate of the Buchner funnel were washed using ethanol (approximately 70 ml).

The washing was performed by adding 95% ethanol to the solid portion that was obtained, and stirring the resultant mixture, and filtering the mixture. A solid portion after the ethanol washing was scrapped into a stainless stein of 500 ml, water (100 g) was added to the solid portion, and stirring and washing was performed by stirrer for 10 minutes. After the stirring and washing, a solid portion and a liquid portion are separated using the Buchner funnel, the funnel was left as is for eight hours in a thermostatic bath of 110° C. to evaporate the liquid portion containing water as a main component, and the solid portion (i.e, regenerated clay) that was obtained was collected.

Similarly to Example 5, the deacidified soybean oil was decolorized by the regenerated clay that was collected, and chromaticity of the decolorized oil was measured.

The waste clay, which was used, was regenerated again as new waste clay. The regeneration and decolorization processes were repeated five times.

<<Condition 2>>

The stirrer (Mighty MAGshiel MG-4 type (trade name), manufactured by NAKAMURA SCIENTIFIC INSTRUMENTS INDUSTRY CO., LTD.), the thermometer holder, and the glass cover were provided to a four-mouth flask. Next, 100 g of waste clay that was obtained in the decolorization process of deacidified soybean oil (waste clay that was obtained after using GALLEON EARTH (trade name, manufactured by MIZUSAWA INDUSTRIAL CHEMICALS, LTD.) in a decoriztaion process), 200 g of 95% ethanol, and 3 g of a sulfuric acid were put into the flask.

The Dimorth cooler was connected to the flask, the temperature of the oil bath was set to 80° C., and stirring was performed. A point of time at which the reflux of the ethanol was confirmed was set to the reaction initiation time. The stirring speed was set to 300 rpm by THREE-ONE MOTOR FBL 3000 (trade name, manufactured by SHINTO Scientific Co., Ltd), and the reaction time was set to five hours.

After the reaction was terminated, 65 mol % of sodium hydroxide was added to the reaction solution, mixing and neutralization were performed, and then separation into a solid portion and a liquid portion was performed by a Buchner funnel. When performing the separation, the inside of the four-mouth flask and a perforated plate of the Buchner funnel were washed using ethanol (approximately 70 ml).

The washing was performed by adding 95% ethanol to the solid portion that was obtained, and stirring the resultant mixture, and filtering the mixture. A solid portion after the ethanol washing was scrapped into a stainless stein of 500 ml, water (100 g) was added to the solid portion, and stirring and washing was performed by stirrer for 10 minutes. After the stirring and washing, a solid portion and a liquid portion are separated using the Buchner funnel, the funnel was left as is for eight hours in a thermostatic bath of 110° C. to evaporate the liquid portion containing water as a main component, and the solid portion (regenerated clay) that was obtained was collected.

Similarly to Example 5, the deacidified soybean oil was decolorized by the regenerated clay that was collected, and chromaticity of the decolorized oil was measured.

The waste clay, which was used, was regenerated again as new waste clay. The regeneration and decolorization processes were repeated five times.

Chromaticity measurement results of the decolorized oil that was decolorized with the regenerated clay in Conditions 1 and 2, and chromaticity measurement results of the deacidified soybean oil that was not subjected to the decolorization process are shown in Table 20 (Condition 1) and Table 21 (Condition 2) for each number of regeneration times. From these results, at Condition 1 in which the neutralization reaction was not performed, a variation in the decolorization capacity was hardly shown according to repetition of the number of regeneration times, and the regenerated clay, which was obtained after repeating the regeneration process five times, shown very high decolorization capacity. In addition, at Condition 2 in which the neutralization reaction was performed, it was observed that the decolorization capacity slightly decreased due to the repetition of the number of regeneration times, but the regenerated clay, which was obtained after repeating the regeneration process five times, shown sufficiently high decolorization capacity.

TABLE 20

| | The number of regeneration times | | | | |
|---|---|---|---|---|---|
| | 1 | 2 | 3 | 4 | 5 |
| L* value | 99.40 | 99.35 | 99.40 | 99.20 | 99.20 |
| Y value | 12 | 12 | 12 | 12 | 12 |
| L* value of unused clay | | | 99.35 | | |
| Y value of unused clay | | | 12 | | |

TABLE 21

| | The number of regeneration times | | | | |
|---|---|---|---|---|---|
| | 1 | 2 | 3 | 4 | 5 |
| L* value | 99.01 | 99.02 | 99.05 | 98.18 | 98.20 |
| Y value | 17 | 17 | 17 | 24 | 24 |
| L* value of unused clay | | | 99.35 | | |
| Y value of unused clay | | | 12 | | |

INDUSTRIAL APPLICABILITY

The method for producing the regenerated clay of the invention is suitably applicable to a field of producing fats and oils.

The invention claimed is:
1. A method for producing regenerated clay, the method comprising the steps of:
   mixing waste clay that has been used for purification of fats and oils, lower alcohol, and an acidic catalyst;

performing extraction of oily ingredients from the waste clay, and an esterification reaction between the fats and oils and/or a free fatty acid in the oily ingredients and the lower alcohol at the same time so as to regenerate a decolorization capacity of the waste clay to obtain a regenerated clay;

adjusting a pH of the regenerated clay of which decolorization capacity is regenerated to 3 to 8, after the extraction of the oily ingredients from the waste clay;

subsequently washing the regenerated clay with a solvent having an SP value, which indicates a solubility parameter, of 7 to 15 and pH of 3 to 8; and washing the regenerated clay with water, after washing the regenerated clay with the solvent having the SP value of 7 to 15 and pH of 3 to 8.

2. The method for producing regenerated clay according to claim 1,
wherein 50 to 900 parts by mass of the lower alcohol is mixed with respect to 100 parts by mass of the waste clay.

3. The method for producing regenerated clay according to claim 1,
wherein the extraction of the oily ingredients, and the esterification reaction between the fats and oils and/or the free fatty acid in the oily ingredients and the lower alcohol are performed at a temperature of 60 to 200° C.

4. The method for producing regenerated clay according to claim 1,
wherein a difference between an L* value of the fats and oils, which are purified using the clay of which decolorization capacity is regenerated, and which is determined in accordance with a CIElab method, and an L* value of the fats and oils, which are purified using unused clay, and which is determined in accordance with the CIElab method is 2 or less.

5. The method for producing regenerated clay according to claim 1,
wherein a difference between a Y value of the fats and oils, which are purified using the clay of which decolorization capacity is regenerated, and which is determined in accordance with a Lovibond colorimeter having a cell length of 5.25 inches, and a Y value of the fats and oils, which are purified using unused clay, and which is determined in accordance with the Lovibond colorimeter is 25 or less.

6. The method for producing regenerated clay according to claim 1,
wherein the ester having an acid value of 10 or less is obtained by the esterification reaction between the fats and oils and/or the free fatty acid in the oily ingredients and the lower alcohol.

7. The method for producing regenerated clay according to claim 1,
wherein the acidic catalyst is an acid catalyst.

8. The method for producing regenerated clay according to claim 7,
wherein the acid catalyst is a sulfuric acid.

9. The method for producing regenerated clay according to claim 1,
wherein the lower alcohol is alcohol having 8 or less carbon atoms.

10. The method for producing regenerated clay according to claim 1, further comprising:
washing the regenerated clay of which decolorization capacity is regenerated with a solvent having an SP value, which indicates a solubility parameter, of 7 to 15, after the extraction of the oily ingredients from the waste clay.

11. The method for producing regenerated clay according to claim 10,
wherein the washing of the regenerated clay is performed at 0 to 200° C.

12. The method for producing regenerated clay according to claim 1, further comprising:
removing a salt from the regenerated clay, after washing the regenerated clay with the solvent having the SP value of 7 to 15 and pH of 3 to 8.

13. The method for producing regenerated clay according to claim 1,
wherein the fats and oils are vegetable oils.

14. A method for producing purified fats and oils, the method comprising the step of:
mixing waste clay that has been used for purification of fats and oils, lower alcohol, and an acidic catalyst;

performing extraction of oily ingredients from the waste clay, and an esterification reaction between the fats and oils and/or a free fatty acid in the oily ingredients and the lower alcohol at the same time so as to regenerate a decolorization capacity of the waste clay to obtain a regenerated clay;

adjusting a pH of the regenerated clay of which decolorization capacity is regenerated to 3 to 8, after the extraction of the oily ingredients from the waste clay;

subsequently washing the regenerated clay with a solvent having an SP value, which indicates a solubility parameter, of 7 to 15 and pH of 3 to 8;

washing the regenerated clay with water, after washing the regenerated clay with the solvent having the SP value of 7 to 15 and pH of 3 to 8; and decolorizing fats and oils using the regenerated clay.

* * * * *